US007881900B2

(12) United States Patent
Kitamura et al.

(10) Patent No.: US 7,881,900 B2
(45) Date of Patent: Feb. 1, 2011

(54) ACCELERATION MEASURING DEVICE

(75) Inventors: Toru Kitamura, Tokyo (JP); Masaya Yamashita, Tokyo (JP)

(73) Assignee: Asahi Kasei Emd Corporation, Tokyo (JP)

( * ) Notice: Subject to any disclaimer, the term of this patent is extended or adjusted under 35 U.S.C. 154(b) by 266 days.

(21) Appl. No.: 12/159,976

(22) PCT Filed: Dec. 27, 2006

(86) PCT No.: PCT/JP2006/326015

§ 371 (c)(1),
(2), (4) Date: Jul. 2, 2008

(87) PCT Pub. No.: WO2007/077859

PCT Pub. Date: Jul. 12, 2007

(65) Prior Publication Data

US 2009/0133466 A1    May 28, 2009

(30) Foreign Application Priority Data

Jan. 5, 2006 (JP) ............................. 2006-000721

(51) Int. Cl.
 *G01P 15/00* (2006.01)
(52) U.S. Cl. ..................................... 702/141
(58) Field of Classification Search .................. 702/141
 See application file for complete search history.

(56) References Cited

U.S. PATENT DOCUMENTS 6,337,688 B1    1/2002  Berstis 6,892,578 B2 *  5/2005  Saitoh et al. ............. 73/514.33
2001/0019089 A1    9/2001  Happ
2004/0007064 A1    1/2004  Sakaguchi

FOREIGN PATENT DOCUMENTS

| EP | 1788396 A1 | 5/2007 |
|---|---|---|
| JP | 06-156184 | 6/1994 |
| JP | 6-331647 | 12/1994 |
| JP | 07-242112 | 9/1995 |
| JP | 09-043269 | 2/1997 |
| JP | 2000-356647 | 12/2000 |
| JP | 2003-101033 | 4/2003 |
| JP | 2004-93552 | 3/2004 |

(Continued)

OTHER PUBLICATIONS

Office Action, USPTO, U.S. Appl. No. 11/659,971, mailed Feb. 2, 2009.

(Continued)

*Primary Examiner*—Aditya Bhat
(74) *Attorney, Agent, or Firm*—Finnegan, Henderson, Farabow, Garrett & Dunner, LLP

(57) ABSTRACT

A reference point defined on a two dimensional or three dimensional orthogonal coordinate space and scale reference of respective axes are estimated based on a distribution on the three dimensional orthogonal coordinate space at the time when respective axial components of an acceleration data group comprised of plural acceleration data including multi-axial components and a importance group pertaining to the acceleration data group, and the respective acceleration data are corrected based on the estimated reference point and scale reference of the respective axes.

16 Claims, 7 Drawing Sheets

FOREIGN PATENT DOCUMENTS

| JP | 2004-235606 | 8/2004 |
| JP | 2005-56597 | 3/2005 |
| WO | WO 2006/016671 A1 | 2/2006 |

OTHER PUBLICATIONS

Office Action, USPTO, U.S. Appl. No. 11/659,971, mailed Sep. 3, 2008.

Office Action, USPTO, U.S. Appl. No. 11/659,971, mailed Apr. 3, 2008.

Lai, Alan et al., 'Semi-Automatic Calibration Technique Using Six Inertial Frames of Reference', Proceeding of SPIE, vol. 5274, pp. 531-542, 2003.

J.C. Lotters et al. "Procedure for in-use calibration triaxial accelerometers in medical applications," Sensors and Actuators A 68, pp. 221-228, 1998.

W. H. Press, S. A. Teukolsky, W. T. Vetterling and B. P. Flannery, Numerical Recipes in C, Second Edition, Cambridge University Press, USA, 1992, pp. 32-104.

W. H. Press, S. A. Teukolsky, W. T. Vetterling and B. P. Flannery, Numerical Recipes in C, Second Edition, Cambridge University Press, USA, 1992, pp. 394-455.

Communication from European Patent Office in EP 06 843 397.8 dated Jul. 22, 2010, 9 pages.

Supplementary Search Report dated Jul. 8, 2010 in the corresponding European Patent Application No. 06843397.8, 4 pages.

\* cited by examiner

| ARRAY NUMBER | | 0 | 1 | 2 | 3 | 4 | 5 | 6 | 7 |
|---|---|---|---|---|---|---|---|---|---|
| | REPRESENTATIVE DATA | X MAX | X MIN | Y MAX | Y MIN | Z MAX | Z MIN | | |
| STORED DATA | TOTAL IMPORTANCE 1 | TOTAL IMPORTANCE (X MAX) | TOTAL IMPORTANCE (X MIN) | TOTAL IMPORTANCE (Y MAX) | TOTAL IMPORTANCE (Y MIN) | TOTAL IMPORTANCE (Z MAX) | TOTAL IMPORTANCE (Z MIN) | | |
| | TEMPERATURE | TEMPERATURE (X MAX) | TEMPERATURE (X MIN) | TEMPERATURE (Y MAX) | TEMPERATURE (Y MIN) | TEMPERATURE (Z MAX) | TEMPERATURE (Z MIN) | | |
| | TIME | TIME (X MAX) | TIME (X MIN) | TIME (Y MAX) | TIME (Y MIN) | TIME (Z MAX) | TIME (Z MIN) | | |

FIG.3

ACCELERATION MEASURING DEVICE

CROSS-REFERENCE TO RELATED APPLICATIONS

This Application is the U.S. national stage under 35 U.S.C. §371 of International Application No. PCT/JP2006/326015, filed on Dec. 27, 2006, and claims priority to JP 2006-000721, filed Jan. 5, 2006. All of the applications are incorporated herein by reference in their entirety.

TECHNICAL FIELD

The present invention relates to an acceleration measuring device for correcting output signal outputted from a multi-axial acceleration sensor. Especially, the present invention relates to an acceleration measuring device that can obtain an offset or both an offset and sensitivity necessary for output correction for a bi-axial or tri-axial acceleration sensor by repeatedly obtaining output data of the bi-axial or tri-axial acceleration sensor without being careful to set an attitude of the acceleration measuring device in a specific direction.

BACKGROUND ART

In recent years, a piezo-resistive type tri-axial acceleration sensor of a semiconductor device using an MEMS (Micro Electro Mechanical Systems) technique is developed as a light weight and small type of a tri-axial acceleration sensor that can be incorporated in a portable apparatus (see, for example, Japanese Patent Laid-Open No. 2003-101033).

In a tri-axial acceleration sensor that detects acceleration and converts the acceleration to a voltage, when sensitivities in respective axial directions are represented as $r_x$, $r_y$, and $r_z$ and offsets on respective axes are represented as $x_o$, $y_o$, and $z_o$, outputs x, y, and z of the acceleration sensor with respect to accelerations $a_x$, $a_y$, and $a_z$ are represented as indicated by the following formula.

$$\begin{cases} x = r_x a_x + x_o \\ y = r_y a_y + y_o \\ z = r_z a_z + z_o \end{cases} \quad \text{[Numeral 1]}$$

In general, sensitivities and offsets have fluctuation respectively and, in particular, the fluctuation in offsets cannot be ignored. Moreover, in the case of a piezo-resistive type acceleration sensor, sensitivities and offsets have marked temperature characteristics. In addition, the temperature characteristic of offsets often shows large fluctuation.

In order to solve such problems, the means described below is used in a conventional acceleration measuring device (see, for example, Japanese Patent Laid-Open No. Hei6-331647).

In an adjustment and test process before shipment, sensitivities and offsets are measured in different plural temperature environment such as 0° C., 25° C., and 60° C. and then the measurement data of sensitivities and offsets is stored to the storing means incorporated in the acceleration measuring device such as an EEPROM.

Further an output correction circuit is incorporated in the acceleration measuring device and then fluctuation and temperature characteristics of sensitivities and offsets included in an acceleration sensor output voltage are calculated and corrected based on present temperature data and the stored measurement data when the acceleration measuring device is used.

However, this type of acceleration measuring device in the past has disadvantages described below.

1) The measurement in the different plural temperature atmospheres and the measurement of sensitivities extremely increase the number of steps of test, measurement time, and equipment cost.

2) The calculation of temperature characteristics of sensitivities and offsets in the output correction circuit complicates a circuit configuration and increases cost.

3) It is necessary to increase the number of measurement temperatures and complicate a temperature characteristic calculation portion in the output correction circuit in order to improve accuracy of the calculation of temperature characteristics of sensitivities and offsets. From this point, it is difficult to realize improvement of calculation accuracy.

In the conventional acceleration measuring device, means for solution is disclosed below. (see, for example, Japanese Patent Laid-Open No. 2004-93552).

Every time the acceleration measuring device is used, for example, as shown in FIGS. 7A to 7F, an attitude of an acceleration measuring device 203 are adjusted in six ways to measure output voltages of the tri-axial acceleration sensor 202 such that acceleration detection axial directions of a tri-axial acceleration sensor 202 are parallel to a direction of the gravitational acceleration "g" respectively, and obtain following output voltage data.

$x_1$: x axis measurement value in an attitude in FIG. 7A
$x_2$: x axis measurement value in an attitude in FIG. 7B
$y_1$: y axis measurement value in an attitude in FIG. 7C
$y_2$: y axis measurement value in an attitude in FIG. 7D
$z_1$: z axis measurement value in an attitude in FIG. 7E
$z_2$: z axis measurement value in an attitude in FIG. 7F Data of sensitivities and offsets necessary for output correction for the tri-axial acceleration sensor are calculated by the following formula.

$$\begin{cases} r_x = \frac{x_1 - x_2}{2g} \\ r_y = \frac{y_1 - y_2}{2g} \\ r_z = \frac{z_1 - z_2}{2g} \end{cases}, \begin{cases} x_o = \frac{x_1 + x_2}{2} \\ y_o = \frac{y_1 + y_2}{2} \\ z_o = \frac{z_1 + z_2}{2} \end{cases} \quad \text{[Numeral 2]}$$

However, this type of conventional acceleration measuring device has disadvantages described below.

1) It is always necessary to adjust attitudes of the acceleration measuring device in plural specific directions, respectively. This case is extremely complicated and inconvenient for a user.

2) Moreover, it is difficult for the user to accurately adjust directions while handling the acceleration measurement device by hand. Errors become larger in sensitivities and offsets calculated by the above formula.

There is an acceleration measuring device (see Japanese Patent Laid-Open No. 2005-056597) in which offsets or both of offsets and sensitivities necessary for output correction for a bi-axial or tri-axial acceleration sensor is acquired by repeatedly obtaining output data of the bi-axial or tri-axial acceleration sensor without setting attitudes of the acceleration measuring device in a specific direction.

The acceleration measuring device described in Japanese Patent Laid-Open No. 2005-056597 estimates offsets or both of offsets and sensitivities using acceleration data at the stationary time.

Acceleration "a" can be resolved into dynamic acceleration "k" and gravitational acceleration "g". Since the gravitational acceleration "g" is constant, $$|g|^2 = g^2 = \text{const} = g_x^2 + g_y^2 + g_z^2 \qquad \text{[Numeral 3]}$$

When dynamic acceleration is 0 (uniform motion or standstill), if sensitivities of respective axes of an acceleration sensor are the same (r), measurement output values (x, y, z) of the acceleration sensor are distributed on a sphere surface.

$$(x-x_o)^2 + (y-y_o)^2 + (z-z_o)^2 = r^2 g^2 \qquad \text{[Numeral 4]}$$

According to the above formula (numeral 4), it is possible to estimate offsets ($x_o$, $y_o$, $z_o$) and sensitivities (r) due to four different measurement points. However, actually, noise is superimposed on outputs of the acceleration sensor. Therefore, it is preferable to estimate offsets and sensitivities using a statistical method described below. With N-set of measured acceleration values ($x_i$, $y_i$, $z_i$, i=1 to N), $$\epsilon_i = (x_i - x_o)^2 + (y_i - y_o)^2 + (z_i - z_o)^2 - r^2 g^2 \qquad \text{[Numeral 5]}$$

is set. And then offsets and sensitivities that minimize fluctuation in $\epsilon_i$ are estimated. When the fluctuation index is defined as a sum of squares of $\epsilon_i$, offsets and sensitivities are calculated by the following formula:

$$\begin{bmatrix} \sum_{i=1}^{N} x_i(x_i - \bar{x}) & \sum_{i=1}^{N} y_i(x_i - \bar{x}) & \sum_{i=1}^{N} z_i(x_i - \bar{x}) \\ \sum_{i=1}^{N} y_i(x_i - \bar{x}) & \sum_{i=1}^{N} y_i(y_i - \bar{y}) & \sum_{i=1}^{N} z_i(y_i - \bar{y}) \\ \sum_{i=1}^{N} z_i(x_i - \bar{x}) & \sum_{i=1}^{N} z_i(y_i - \bar{y}) & \sum_{i=1}^{N} z_i(z_i - \bar{z}) \end{bmatrix} \begin{bmatrix} x_0 \\ y_0 \\ x_0 \end{bmatrix} = \qquad \text{[Numeral 6]}$$

$$\frac{1}{2}\begin{bmatrix} \sum_{i=1}^{N} (x_i^2 + y_i^2 + z_i^2)(x_i - \bar{x}) \\ \sum_{i=1}^{N} (x_i^2 + y_i^2 + z_i^2)(y_i - \bar{y}) \\ \sum_{i=1}^{N} (x_i^2 + y_i^2 + z_i^2)(z_i - \bar{z}) \end{bmatrix}$$

$$r^2 = \frac{1}{N}\sum_{i=1}^{N}\{(x_i - x_0)^2 + (y_i - y_0)^2 + (z_i - z_0)^2\} \qquad \text{[Numeral 7]}$$

Here, $$\bar{x} = \frac{1}{N}\sum_{i=1}^{N} x_i, \quad \bar{y} = \frac{1}{N}\sum_{i=1}^{N} y_i, \quad \bar{z} = \frac{1}{N}\sum_{i=1}^{N} z_i \qquad \text{[Numeral 8]}$$

When dynamic acceleration is 0 (uniform motion or standstill) and sensitivity is different in the respective axes of the acceleration sensor, measurement output values (x, y, z) are distributed on an ellipsoid.

$$\frac{(x-x_o)^2}{r_x^2} + \frac{(y-y_o)^2}{r_y^2} + \frac{(z-z_o)^2}{r_z^2} = g^2 \qquad \text{[Numeral 9]}$$

According to the above formula (Numeral 9), it is possible to estimate offset and sensitivities due to six different measurement points. However, actually, noise is superimposed on outputs of the acceleration sensor. Therefore, it is preferable to estimate offsets and sensitivities using a statistical method described below. With respect to N-set of measured acceleration values ($x_i$, $y_i$, $z_i$, i=1 to N)

$$\varepsilon_i = X + BY_i + CZ_i + DU_i + EV_i + FW_i - G \qquad \text{[Numeral 10]}$$

$$\begin{cases} X_i = x_i^2, Y_i = y_i^2, Z_i = z_i^2, U_i = x_i, V_i = y_i, \\ W_i = z_i, B = \frac{r_x^2}{r_y^2}, C = \frac{r_x^2}{r_z^2}, D = -2x_0, \\ E = -2\frac{r_x^2}{r_y^2}y_0, F = -2\frac{r_x^2}{r_z^2}z_0, \\ G = r_x^2 - x_0^2 - \frac{r_x^2}{r_y^2}y_0^2 - \frac{r_x^2}{r_z^2}z_0^2 \end{cases}$$

is set. And then offsets and sensitivities that minimize fluctuation in $\epsilon_i$ are estimated. When the fluctuation is defined as a sum of squares of $\epsilon_i$, B, C, D, E, F, and G are calculated by the following formula;

$$\begin{bmatrix} \sum_{i=1}^{N} Y_i(Y_i - \hat{Y}) & \sum_{i=1}^{N} Y_i(Z_i - \hat{Z}) & \sum_{i=1}^{N} Y_i(U_i - \hat{U}) & \sum_{i=1}^{N} Y_i(V_i - \hat{V}) & \sum_{i=1}^{N} Y_i(W_i - \hat{W}) \\ \sum_{i=1}^{N} Z_i(Y_i - \hat{Y}) & \sum_{i=1}^{N} Z_i(Z_i - \hat{Z}) & \sum_{i=1}^{N} Z_i(U_i - \hat{U}) & \sum_{i=1}^{N} Z_i(V_i - \hat{V}) & \sum_{i=1}^{N} Z_i(W_i - \hat{W}) \\ \sum_{i=1}^{N} U_i(Y_i - \hat{Y}) & \sum_{i=1}^{N} U_i(Z_i - \hat{Z}) & \sum_{i=1}^{N} U_i(U_i - \hat{U}) & \sum_{i=1}^{N} U_i(V_i - \hat{V}) & \sum_{i=1}^{N} U_i(W_i - \hat{W}) \\ \sum_{i=1}^{N} V_i(Y_i - \hat{Y}) & \sum_{i=1}^{N} V_i(Z_i - \hat{Z}) & \sum_{i=1}^{N} V_i(U_i - \hat{U}) & \sum_{i=1}^{N} V_i(V_i - \hat{V}) & \sum_{i=1}^{N} V_i(W_i - \hat{W}) \\ \sum_{i=1}^{N} W_i(Y_i - \hat{Y}) & \sum_{i=1}^{N} W_i(Z_i - \hat{Z}) & \sum_{i=1}^{N} W_i(U_i - \hat{U}) & \sum_{i=1}^{N} W_i(V_i - \hat{V}) & \sum_{i=1}^{N} W_i(W_i - \hat{W}) \end{bmatrix} \begin{bmatrix} B \\ C \\ D \\ E \\ F \end{bmatrix} = -\begin{bmatrix} \sum_{i=1}^{N} Y_i(X_i - \hat{X}) \\ \sum_{i=1}^{N} Z_i(X_i - \hat{X}) \\ \sum_{i=1}^{N} U_i(X_i - \hat{X}) \\ \sum_{i=1}^{N} V_i(X_i - \hat{X}) \\ \sum_{i=1}^{N} W_i(X_i - \hat{X}) \end{bmatrix} \qquad \text{[Numeral 11]}$$

$$G = \bar{X} + B\bar{Y} + C\bar{Z} + D\bar{U} + E\bar{V} + F\bar{W} \qquad \text{[Numeral 12]}$$

Here, $$\overline{X} = \frac{1}{N}\sum_{i=1}^{N} X_i, \overline{Y} = \frac{1}{N}\sum_{i=1}^{N} Y_i, \overline{Z} = \frac{1}{N}\sum_{i=1}^{N} Z_i,$$ [Numeral 3]

$$\overline{U} = \frac{1}{N}\sum_{i=1}^{N} U_i, \overline{V} = \frac{1}{N}\sum_{i=1}^{N} V_i, \overline{W} = \frac{1}{N}\sum_{i=1}^{N} W_i$$

After B, C, D, E, F, and G are calculated, offsets and sensitivities are calculated by the following equation:

$$x_0 = -\frac{D}{2}, y_0 = -\frac{E}{2B}, z_0 = -\frac{F}{2C},$$ [Numeral 14]

$$r_x^2 = G + x_0^2 + By_0^2 + Cz_0^2, r_y^2 = \frac{r_x^2}{B}, r_z^2 = \frac{r_x^2}{C}$$

Patent Document 1: Japanese Patent Laid-Open No. 2003-101033

Patent Document 2: Japanese Patent Laid-Open No. 6-331647

Patent Document 3: Japanese Patent Laid-Open No. 2004-93552

Patent Document 4: Japanese Patent Application No. 2005-056597

DISCLOSURE OF THE INVENTION

However, this type of conventional acceleration measuring device has disadvantages described below.

1) When a user normally operates the acceleration measuring device, in general, it is difficult to obtain acceleration data at the stationary state.

2) When obtaining acceleration data at the stationary state, the attitude of acceleration sensor is mostly obtained in the same attitude it takes long time to obtain acceleration data at the stationary state in plural attitudes.

3) When temperature is varied and as a result offset changes obviously, obtained data so far must be discarded and new data must be obtained again. Then it takes long time. Alternatively, storing means such as an EEPROM must be incorporated in the acceleration measuring device to store all measurement data obtained so far or estimated offsets and sensitivities per each temperature area.

Therefore, an object of the present invention is to provide an acceleration measuring device that quickly obtains offsets or both of offsets and sensitivities necessary for output correction for a bi-axial or tri-axial acceleration sensor by repeatedly obtaining output data of the bi-axial or tri-axial acceleration sensor without setting attitudes of the acceleration measuring device in a specific direction.

The present invention configures an acceleration measuring device by including acceleration detecting means for detecting accelerations in two-axis or three-axis directions; acceleration data obtaining means for obtaining two-axis or three-axis acceleration data detected by the acceleration detecting means; importance calculating means for calculating importance of the acceleration data obtained by the acceleration data obtaining means; reference point estimating means for estimating a reference point defined on a two dimensional or three dimensional orthogonal coordinate space and scale reference along with the respective axes based on both a distribution of a group of acceleration data obtained by the acceleration data obtaining means on the two dimensional orthogonal coordinate space or the three dimensional orthogonal coordinate while respective axial components of the acceleration data are defined as coordinate values and a importance group including importance of different values calculated by the importance calculating means according to the two-axis or three-axis acceleration data group; and offset correcting means for correcting the respective acceleration data obtained by the acceleration data obtaining means, based on the reference point and the scale reference along with the respective axes estimated by the estimating means.

The reference point estimating means may define a circle on the two dimensional orthogonal coordinate plane or a spherical surface on the three dimensional orthogonal coordinate space based on both the distribution of a group of acceleration data on the two dimensional orthogonal coordinate plane or the three dimensional orthogonal coordinate space obtained by the acceleration data obtaining means and the importance group calculated by the importance calculating means pertaining to the acceleration data group. The reference point estimating means may estimate a coordinate of center point and a radius of the circle or the sphere, set the estimated coordinate of center point as the reference point, and set the radius as the scale reference of the respective axes. The offset correcting means may correct offsets of the two-axis or three-axis acceleration data based on the reference point estimated by the reference point estimating means.

The reference point estimating means may define an ellipse on the two dimensional orthogonal coordinate plane or an ellipsoidal surface on the three dimensional orthogonal coordinate space based on both the distribution of a group of two-axis or three-axis acceleration data obtained by the acceleration data obtaining means on the two dimensional orthogonal coordinate plane or the three dimensional orthogonal coordinate space and the importance group calculated by the importance calculating means pertaining to the acceleration data group. The reference point estimating means may estimate a coordinate of center point and radiuses of respective principal axes of the ellipse or the ellipsoidal surface, set the estimated coordinate of center point as the reference point, and set the radiuses of the respective principal axes as the scale reference of the respective axes. The offset correcting means may correct offsets and sensitivities of the respective two-axis or three-axis acceleration data based on the reference point and the scale reference of the respective axes estimated by the reference point estimating means.

The reference point estimating means may include representative data calculating means for calculating a representative data of a group of a predetermined number M of acceleration data obtained by the acceleration data obtaining means; first importance calculating means for calculating first importance of the representative data calculated by the representative data calculating means; accumulating means for accumulating both the representative data, the first importance according to the representative data and additional information while the representative data is calculated by the representative data calculating means representative data; Second importance calculating means for calculating second importance according to the representative data based on both the first importance according to the representative data and the additional information accumulated in the accumulating means. And then, the reference point estimating means may estimate the reference point defined on the two dimensional orthogonal coordinate plane or the three dimensional orthogonal coordinate space and the scale reference of the respective axes based on both a distribution of respective axial components of a predetermined number N of representative datas defined as coordinate values accumulated by the accumulating means on the two dimensional orthogonal coordinate plane or the three dimensional orthogonal coordinate space representative data, and a predetermined number N of second importance calculated by the second importance calculating means according to the representative datas.

The second importance calculating means may calculate the second importance based on importance calculated from the additional information accumulated in the accumulating means according to the representative data and the first importance accumulated in the accumulating means according to the representative data.

The reference point estimating means may define a circle on the two dimensional orthogonal coordinate plane or a spherical surface on the three dimensional orthogonal coordinate space based on both a distribution on the two dimensional orthogonal coordinate plane or the three dimensional orthogonal coordinate plane from using a group of a predetermined number N of representative datas accumulated by the accumulating means and a group of a predetermined number N of second importance according to the representative datas calculated by the second importance calculating means representative data, and the reference point estimating means estimates a coordinate of center point and a radius of the circle or the spherical surface, set the estimated coordinate of center point as the reference point, and set the radius of the respective axes as the scale reference. And then the offset correcting means may correct offsets of the respective two-axis or three-axis acceleration data based on the reference point estimated by the reference point estimating means.

The reference point estimating means may define an ellipse or an ellipsoidal surface on the two dimensional orthogonal coordinate plane or the three dimensional orthogonal coordinate space based on both a distribution on the two dimensional orthogonal coordinate plane or the three dimensional orthogonal coordinate space in a group of a predetermined number N of representative datas accumulated by the accumulating means and a group of a predetermined number N of second importance calculated by the second importance calculating means according to the representative datas, estimate a coordinate of center point and radiuses of respective principal axes of the ellipse or the ellipsoidal surface, set the estimated coordinate of center point as the reference point, set the radiuses of the respective principal axes as the scale reference. The offset correcting means may correct offsets and sensitivities of the respective two-axis or three-axis acceleration data based on the reference point and the scale reference of the respective axes estimated by the reference point estimating means.

The representative data calculating means may calculate an average of the group of a predetermined number M of acceleration data as a representative data.

The first importance calculating means may include means for calculating fluctuation in the group of a predetermined number M of acceleration data and means for calculating importance A that is higher as the fluctuation is smaller.

The fluctuation may be a sum of variances on the respective axes components of the group of a predetermined number M of acceleration data or a maximum value of the variances on the respective axes.

The fluctuation may be a square sum of differences between maximum values and minimum values on the respective axes of the group of a predetermined number M of acceleration components data or the square of a maximum value of the differences between the maximum values and the minimum values on the respective axes.

One of the additional information may be temperature when the acceleration detecting means detects the acceleration data group used in that the representative data calculating means calculates the representative data. And the second importance calculating means may include means for calculating importance B that becomes lower in the case that a difference between temperature as one of the additional information when the acceleration detecting means detects data and temperature as one of the additional information when importance is calculated by the second importance calculating means becomes larger.

One of the additional information may be time information when the acceleration detecting means detects the data group used in that the representative data calculating means calculates the representative data, and the second importance calculating means may include means for calculating importance C that becomes lower in the case that a difference between time when the acceleration detecting means detects data and time when importance is calculated by the second importance calculating means becomes larger.

The acceleration measuring device may further include selecting means for selecting whether the representative data calculated by the representative data calculating means is appropriate. The selecting means may judge that the representative data calculated by the representative data calculating means is appropriate and select the representative data when the first importance calculated by the first importance calculating means is higher than a predetermined value.

The accumulating means may set additionally linear axes that have linear relation with detection axes of the acceleration detecting means. When comparing maximum values, values that obtained by subtracting the second importance corresponding to the representative datas from the representative datas may be compared. When comparing minimum values, values that obtained by adding the representative datas to the second importance corresponding to the representative datas may be compared. A representative data may be selectively accumulated such that a component of the detection axis or linear axis of the acceleration detecting means becomes a maximum or minimum value among a representative data newly selected by the selecting means and representative datas accumulated in the accumulating means.

The acceleration measuring device may further include processed data storing means for storing the number of acceleration data weighted by the importance of the group of acceleration data obtained by the acceleration data obtaining means, a sum of respective axial components weighted by the importance of the group of acceleration data, a sum of values obtained by weighting squares of the respective axial components of the group of acceleration data with the importance, a coefficient group of simultaneous equations for calculating the reference point and the scale reference of the respective axes, and the reference point and the scale reference. The reference point and the scale reference of the respective axes may be estimated based on latest data obtained by the acceleration data obtaining means, importance calculated by the importance calculating means corresponding to the data, and the latest various processed data stored by the processed data storing means.

According to the present invention, a reference point defined on a two dimensional orthogonal coordinate plane or a three dimensional orthogonal coordinate space and scale reference of respective axes are estimated based on both a distribution on the two dimensional orthogonal coordinate plane or the three dimensional orthogonal coordinate space when respective axial components of the group of acceleration data including plural two-axis or three-axis acceleration data are set as coordinate values and a importance group pertaining to the acceleration data group. The acceleration data are corrected based on the estimated reference point and the scale reference of the respective axes. It is possible to repeatedly obtain output data of the bi-axial or tri-axial acceleration sensor without being careful to set attitudes of the acceleration measuring device in specific directions. Thus, offsets or both offsets and sensitivities necessary for output correction for a bi-axial or tri-axial acceleration sensor can be quickly estimated.

According to the present invention, a representative data of an obtained group of a predetermined number M of acceleration data is calculated, first importance of the representative data is calculated, the representative data is selected in the case where the representative data is with in appropriate range, the selected representative data and the first importance and additional information (time, temperature, etc.) according to the representative data are accumulated, second importance according to the representative data is calculated based on the first importance and additional information according to the accumulated representative data. A reference point defined on a two dimensional or three dimensional orthogonal coordinate space and scale reference of respective axes are estimated based on both a distribution on the two dimensional orthogonal coordinate plane or the three dimensional orthogonal coordinate space when respective axial components of the accumulated predetermined number N representative datas are set as coordinate values and a predetermined number N of second importance according to the representative datas. Therefore, it is possible to quickly estimate offsets or both of offsets and sensitivities even when temperature is altered and offsets are clearly changed.

BRIEF DESCRIPTION OF THE DRAWINGS

FIG. 3 is an explanatory diagram showing an example of the structure of a buffer serving as an accumulating portion suitable for accumulating maximum values and minimum values of a detection axis and a linear axis;

BEST MODE FOR CARRYING OUT THE INVENTION

Embodiments of the present invention are explained in detail below with reference to the accompanying drawings.

First Embodiment

Figure 1:
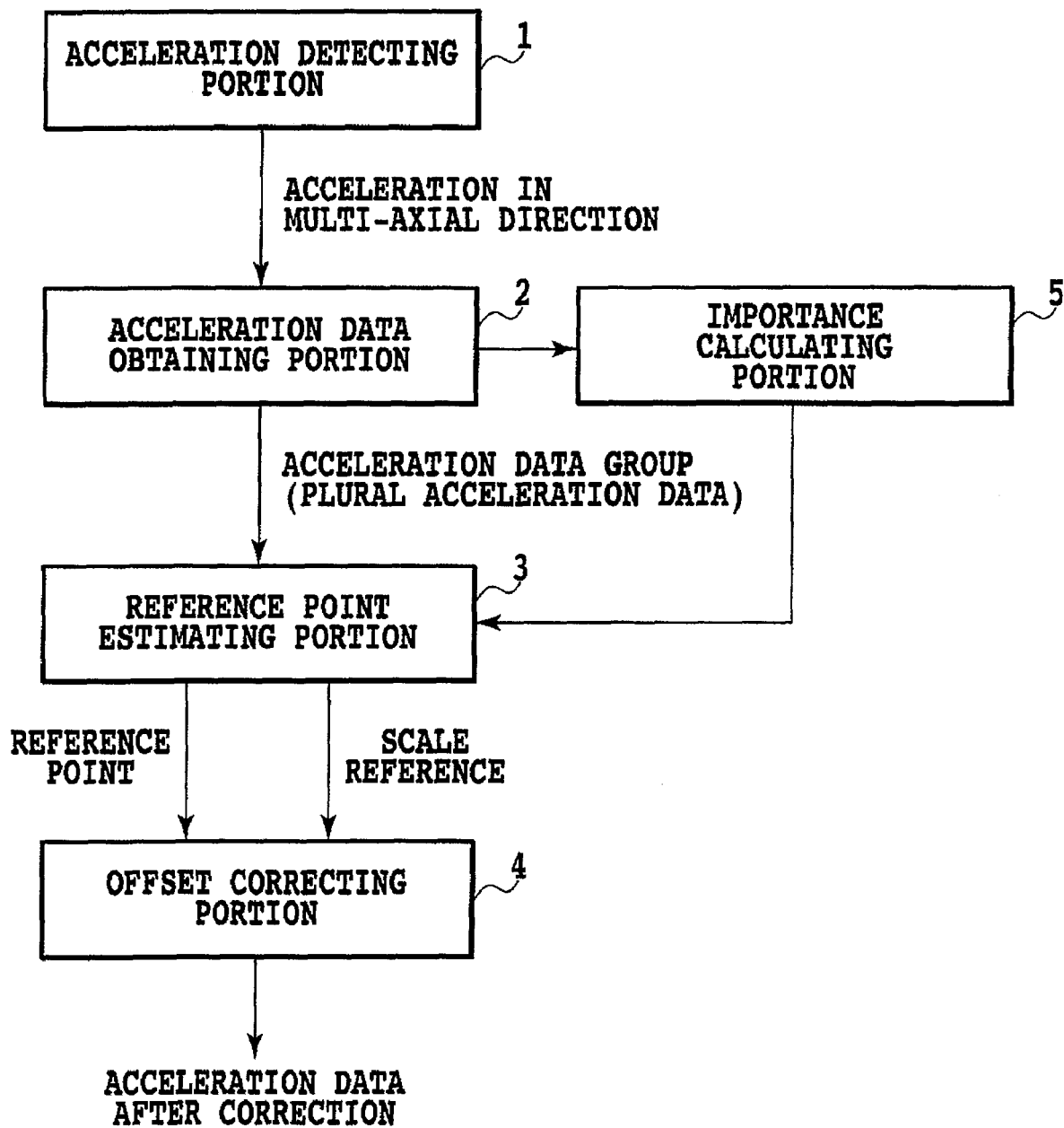
FIG. 1 is a block diagram showing an example of the basic structure of an acceleration measuring device according to a first embodiment of the present invention.

A first embodiment of the present invention is explained on the basis of FIG. 1.

Before explaining an acceleration measuring device according to the present invention in detail, in this embodiment, the basic structure of the acceleration measuring device is schematically explained.

<Schematic Structure>

FIG. 1 shows the rough structure of the acceleration measuring device according to the present invention.

The acceleration measuring device includes an acceleration detecting portion 1, an acceleration data obtaining portion 2, an importance calculating portion 5, a reference point estimating portion 3, and an offset correcting portion 4.

<Schematic Operations>

Basic operations of the acceleration measuring device are explained.

The acceleration detecting portion 1 detects accelerations in two-axis or three-axis directions.

The acceleration data obtaining portion 2 obtains the accelerations detected by the acceleration detecting portion 1 as acceleration data.

The reference point estimating portion 3 estimates a reference point and scale reference of respective axes on a two dimensional orthogonal coordinate plane or a three dimensional orthogonal coordinate space based on a distribution of components of the group of acceleration data obtained by the acceleration data obtaining portion 2 and a group of importance pertaining to the group of acceleration data.

The importance calculating portion 5 calculates importance according to the acceleration data obtained by the acceleration data obtaining portion 2.

The reference point estimating portion 3 estimates a reference point and scale reference of respective axes defined on a two dimensional orthogonal coordinate plane or a three dimensional orthogonal coordinate space based on both a distribution of respective axial components of acceleration group obtained by the acceleration data obtaining portion 2 on the two dimensional orthogonal coordinate plane or the three dimensional orthogonal coordinate space and a importance group calculated by the importance calculating portion 5 pertaining to the respective acceleration data.

The offset correcting portion 4 corrects the respective acceleration data obtained by the acceleration data obtaining portion 2 based on the reference point and the scale reference of the respective axes estimated by the estimating portion 3.

The reference point estimating portion 3 can perform such basic operation, and moreover it can also perform operations described below.

(Sphere Fitting Example)

One example of scale correction, the reference point estimating portion 3 defines a circle on a two dimensional orthogonal coordinate plane or a spherical surface on a three dimensional orthogonal coordinate space based on both a distribution, on the two dimensional orthogonal coordinate plane or the three dimensional orthogonal coordinate space, of a group of acceleration data obtained by the acceleration data obtaining portion 2 and a importance group calculated by the importance calculating means pertaining to the acceleration data group. Then a coordinate of center point and a radius of the circuit or the spherical surface are estimated. The estimated coordinate of center point is set to a reference point, and the radius is set to scale reference of respective axes. Consequently, the offset correcting portion 4 can corrects offsets of two-axis or three-axis acceleration data based on the reference point estimated by the reference point estimating portion 3.

(Ellipse Fitting Example)

As another correction example, the reference point estimating portion 3 defines an ellipse on a two dimensional orthogonal coordinate plane or an ellipsoidal surface on a three dimensional orthogonal coordinate space based on both a distribution, on the two dimensional orthogonal coordinate space or the three dimensional orthogonal coordinate space, of a group of acceleration data obtained by the acceleration data obtaining portion 2 and a importance group calculated by the importance calculating portion 5 pertaining to the group of acceleration data. A coordinate of center point and radiuses of respective principal axes of the ellipse or the ellipsoidal surface are estimated. Then the estimated coordinate of center point is set to a reference point, and the radius of the respective principal axes is set to scale reference of respective axes. Consequently, the offset correcting portion 4 can correct offsets and sensitivities of two-axis or three-axis acceleration data based on the reference point and the scale reference of the respective axes estimated by the reference point estimating portion 3.

By adopting the structure and the operations described above, it is possible to quickly estimate offsets or both of offsets and sensitivities necessary for correction of a bi-axial or tri-axial acceleration sensor output data by repeatedly obtaining output data of the bi-axial or tri-axial acceleration sensor without being careful to set attitudes of the acceleration measuring device in specific directions.

The acceleration measuring device according to the present invention is explained in detail below.

Second Embodiment

Figure 2:
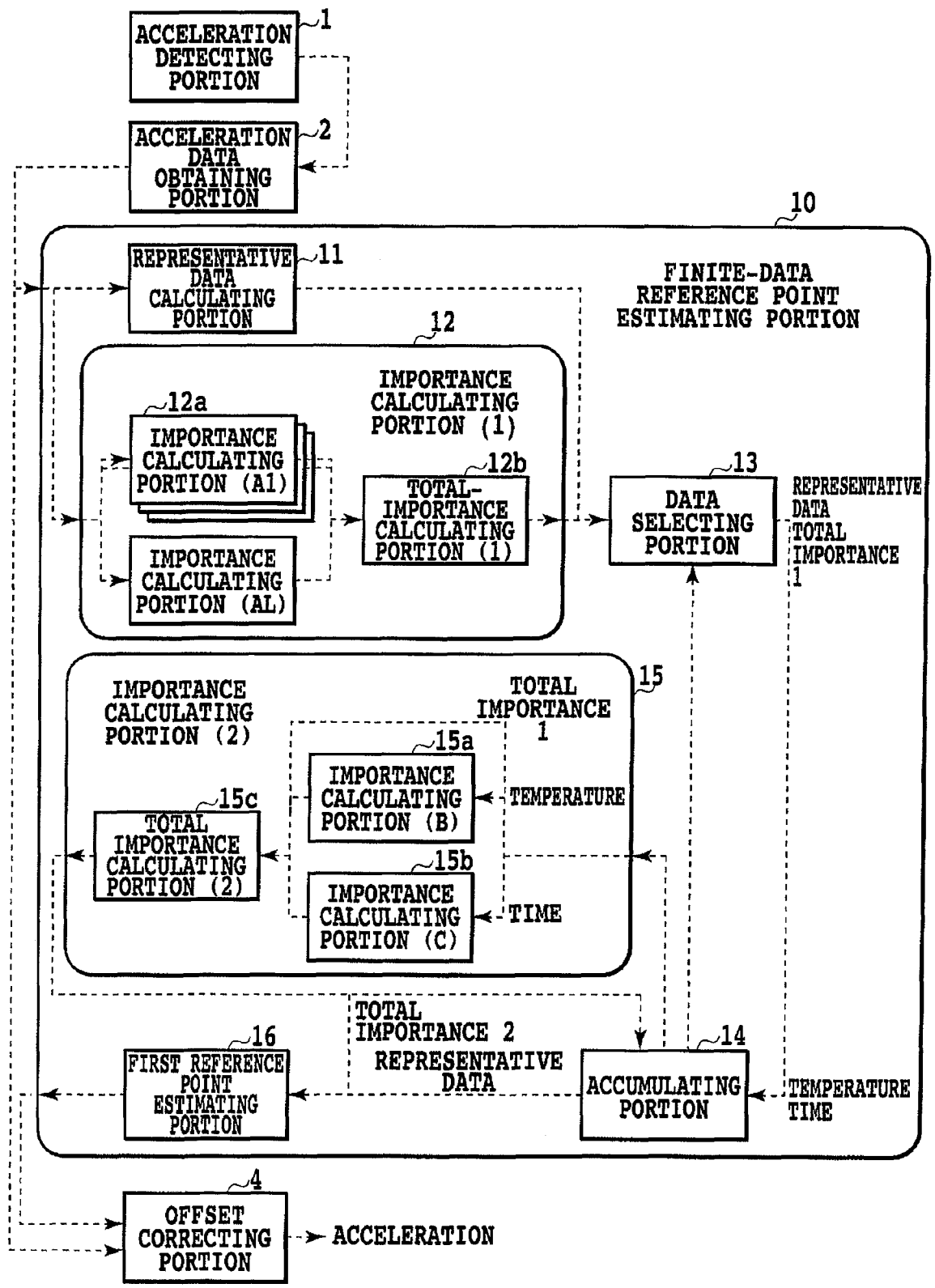
FIG. 2 is a block diagram showing an example of the structure of an acceleration measuring device having an infinite data reference point estimating portion according to a second embodiment of the present invention.
Figure 4:
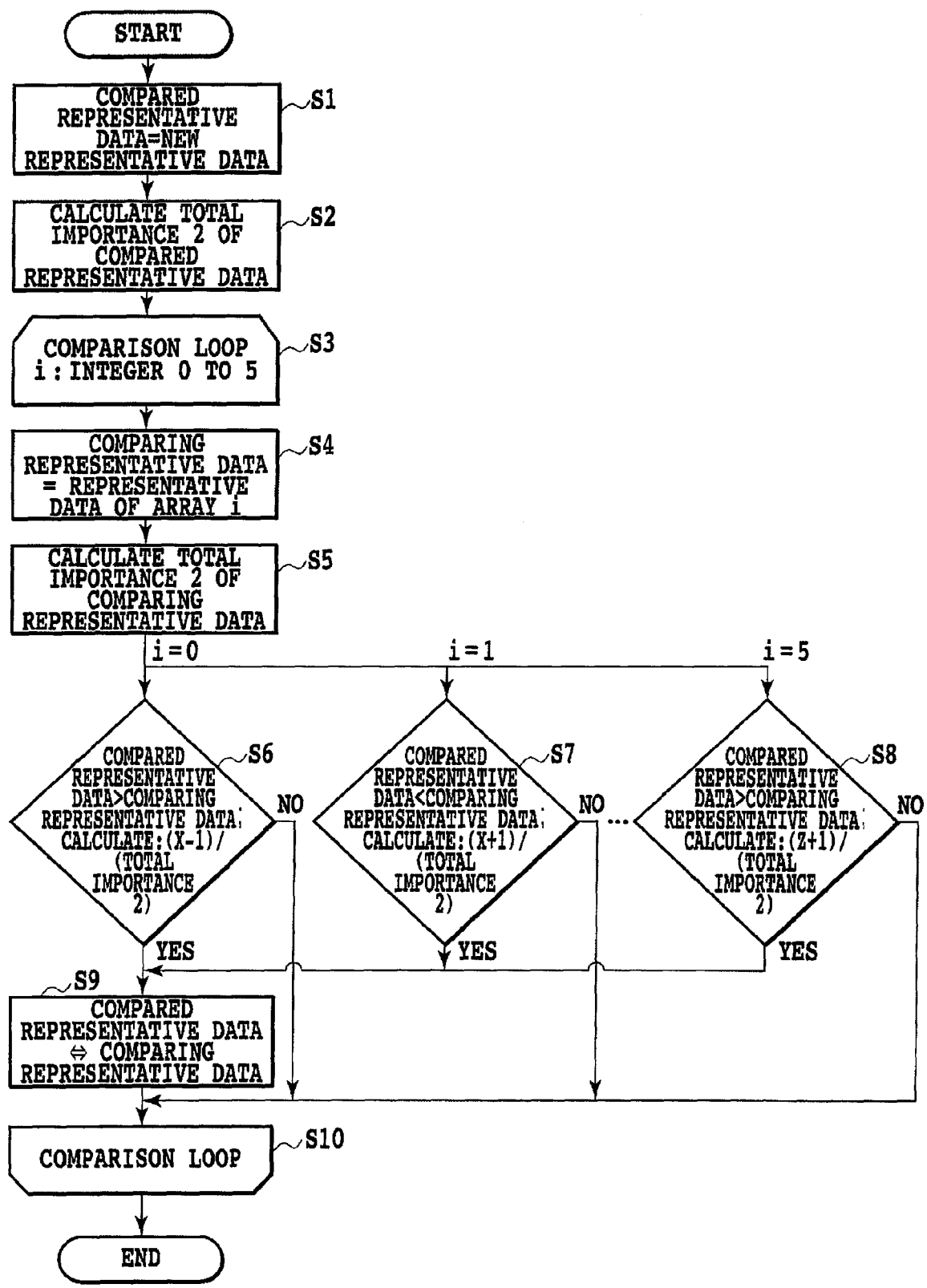
FIG. 4 is a flowchart showing an example of processing for selecting data stored in the accumulating portion.

A second embodiment of the present invention is explained on the basis of FIGS. 2 to 4. Explanation of components same as those in the first embodiment is omitted and the components are denoted by the same reference numerals and signs.

(Finite Data DOE)

<Structure>

FIG. 2 shows an example of the structure of an acceleration measuring device according to the present invention.

The acceleration measuring device includes the acceleration detecting portion 1, the acceleration data obtaining portion 2, a finite data reference point estimating portion 10, and the offset correcting portion 4. In the following explanation, explanation concerning the components other than the finite data reference point estimating portion 10 is omitted.

The finite data reference point estimating portion 10 is explained.

The finite data reference point estimating portion 10 includes a representative data calculating portion 11, a first importance calculating portion 12, a data selecting portion 13, an accumulating portion 14, a second importance calculating portion 15, and a first reference point estimating portion 16.

The representative data calculating portion 11 calculates a representative data of a group of a predetermined number M of acceleration data obtained by the acceleration data obtaining portion 2.

The first importance calculating portion 12 includes L of importance calculating portions (A1 to AL) 12a and a total importance calculating portion (1) 12b and calculates first importance of the representative data calculated by the representative data calculating portion 11.

The data selecting portion 13 judges and selects appropriate representative data calculated by the representative data calculating portion 11.

The accumulating portion 14 accumulates the representative data selected by the data selecting portion 13, the first importance and additional information corresponding to the representative data.

The second importance calculating portion 15 includes a importance calculating portion (B) 15a, a importance calculating portion (C) 15b, and an total importance calculating portion (2) 15c. The second importance calculating portion 15 calculates second importance according to the representative data based on the first importance and the additional information according to the representative data accumulated in the accumulating portion 14.

The first reference point estimating portion 16 estimates a reference point defined on a two dimensional orthogonal coordinate plane or a three dimensional orthogonal coordinate space and scale reference of respective axes based on both a distribution of respective axial components of a predetermined number N of representative datas accumulated by the accumulating portion 14 on the two dimensional orthogonal coordinate plane or the three dimensional orthogonal coordinate space representative data and a predetermined number N of second importance calculated by the second importance calculating portion 15 corresponding to the representative datas.

<Operations>

Operations of the device are explained.

The acceleration detecting portion 1 detects acceleration value with an acceleration sensor and converts a detection value of the acceleration into a voltage.

The acceleration value converted into the voltage is subjected to amplification, filtering, and the like by the acceleration data obtaining portion 2, further A-D (Analogue to Digital)-converted, and obtained as acceleration data. The true acceleration is expanded or contracted in respective measurement axis directions at different ratios due to mainly sensitivity differences. Offsets of respective axes of the acceleration sensor are further superimposed. A quantization error and noise are included in the acceleration data.

The representative data calculating portion 11 calculates a representative data of a group of a predetermined number of acceleration data continuously detected. The representative data is used in estimating offsets and sensitivities with the first reference point estimating portion 16 and is a value that should be distributed on a spherical surface or an ellipsoidal surface. It is preferable that the representative data is gravitational acceleration data.

However, since dynamic acceleration and gravitational acceleration cannot usually be separated, there is no effective guideline for calculating the representative data as gravitational acceleration data.

Therefore, the representative data is set to an average, a median, acceleration data of specific order, or the like of the group of the predetermined number of acceleration data continuously detected. When the predetermined number is 1, output data is directly set as the representative data. representative data If the group of acceleration data is values obtained at the stationary time, it is possible to reduce the influence of noise by taking an average of the acceleration data group. And then they are used as the representative data. Therefore, it is possible to improve accuracy of estimation of offsets and sensitivities.

The first importance calculating portion 12 calculates importance of the representative data. Importance is calculated by different plural methods by the L of importance calculating portions (A1 to AL) 12a and combined by the total importance calculating portion (1) 12b. As a result, total importance 1 is calculated.

Importance is a value representing importance of a representative data when the first reference point estimating portion 16 estimates a reference point. A representative data with higher importance is preferentially used for reference point estimation. The fact that gravitational acceleration is distributed on a spherical surface or an ellipsoidal surface as described above is used to calculate offsets and sensitivities of an acceleration sensor. However acceleration is a sum of dynamic acceleration and gravitational acceleration. Therefore, data with smaller dynamic acceleration is more suitable for offset and sensitivity estimation, i.e., higher in importance.

For example, at first, variances are calculated on respective axes of predetermined number of data that a representative data is calculated. Or variances are calculated from more data than predetermined number, or even a part of predetermined number of data. Then, next, variance representative data judging that in the representative data is set to a lower value in the reason that large dynamic acceleration may be included when a sum of the variances on the respective axes is large. Conversely, importance is set to a higher value in the reason that the representative data may be calculated from data obtained at the stationary time when the sum of the variances on the respective axes is small.

The importance is a concept based on an inverse of variance as described later. An inverse of a maximum value of the variances on the respective axes can be selected as the importance.

The importance may be an inverse of a square sum of differences between maximum values and minimum values on respective axes of a predetermined number of data (or data larger than the predetermined number including the predetermined number of data or data as a part of the predetermined number of data). The importance may be an inverse of the square of a maximum value of the differences between the maximum values and the minimum values on the respective axes. When applying the present invention in a system that has only limited calculation ability, it is more advantageous to calculate importance based on the maximum values and the minimum values than to calculate variances.

What is important is not to accurately calculate importance but to provide a significant difference in importance between data which is suitable for calculating offset and sensitivity (data representing only gravitational acceleration) and data which is not suitable.

Specifically, the importance ($1/\sigma_m^2$) is calculated by the following formula:

$$\text{Importance} = \frac{1}{\sigma_m^2} \qquad \text{[Numeral 15]}$$

$$= \begin{cases} \dfrac{1}{\sigma_x^2 + \sigma_y^2 + \sigma_z^2}, \\ \dfrac{1}{\max(\sigma_x^2, \sigma_y^2, \sigma_z^2)}, \\ \dfrac{1}{(x_{max} - x_{min})^2 + (y_{max} - y_{min})^2 + (z_{max} - z_{min})^2}, \\ \dfrac{1}{\max((x_{max} - x_{min})^2, (y_{max} - y_{min})^2, (z_{max} - z_{min})^2)} \end{cases}$$

Here, $\sigma_x$, $\sigma_y$, $\sigma_z$ are the variances on the respective axes. Further, $x_{max}$, $x_{min}$, $y_{max}$, $y_{min}$, $z_{max}$, and $z_{min}$ are the maximum values and the minimum values on the respective axis measurement values, respectively.

In a typical embodiment, the data selecting portion 13 includes plural small data selecting portions. Only a representative data selected in all the small data selecting portions is adopted. The data selecting portion 13 judges whether calculated representative datas are suitable for reference point estimation and selects a representative data judged as appropriate. Usually, since the number of representative datas used for the reference point estimation is finite, the unsuitable data of the identity is discarded. As a method of selection, for example, a representative data is selected when total importance 1 is equal to or larger than a predetermined value. A representative data is discarded when total importance 1 is too small because it is highly likely that wrong offsets and sensitivities are estimated. Distances between representative data latest selected representative data or all representative datas accumulated in the accumulating portion and a new representative data inputted to the data selecting portion 13 are compared. The distance may be a norm on a measurement value space or may be a maximum value of absolute values of differences between coordinate axes of respective axes. As a result of comparison, data is selected when data is equal to or larger than the predetermined value.

The accumulating portion 14 accumulates the representative data selected by the data selecting portion 13, the total importance 1 pertaining to the representative data, and additional information necessary for calculation of total importance 2.

As the additional information, it is possible to use "time information" and "temperature information" at the time when the acceleration sensor measures the group of acceleration data used for the representative data calculation.

In the fitting calculation to a sphere and an ellipsoid, if acceleration data is accurately present of a spherical surface or an ellipsoidal surface in a three dimensional space, a center point can be accurately calculated even if respective measurement points are distributed in a narrow area on the spherical surface or the ellipsoidal surface. However, since the acceleration data is affected by noise and quantization errors, even if the acceleration sensor is stationary, it is rare that measurement of the acceleration sensor is accurately present on the spherical surface. There is a problem in that, when the distribution area of the measurement points is narrow, the acceleration data is substantially affected by these errors and then accurate estimation calculation cannot be performed.

However, if the measurement data is distributed in a sufficiently wide area in the three dimensional space, the influence of these errors is reduced. A method of selecting and accumulating data such that measurement data is distributed in a wide range in a three dimensional space is disclosed in Patent Document 4.

In Patent Document 4, an arbitrary linear axis is set in a three dimensional orthogonal coordinate space and data at points close to the maximum or the minimum on the axis is accumulated.

In the calculation for application to an elliptical surface, if one or more measurement data are present in positions close to both ends of a major axis and a minor axis of an ellipsoid, extremely accurate estimation calculation can be performed. In an output of a tri-axial acceleration sensor that detects accelerations in three dimensional directions orthogonal to one another, acceleration data is distributed on an ellipsoid having any one of measurement axes as a major axis or a minor axis. Therefore, it is possible to improve accuracy of ellipsoid application calculation by using data having components that are a maximum value and a minimum value on the measurement axes (i.e., three axes) of the acceleration sensor.

When the three measurement axes of the acceleration sensor are represented as X, Y, and Z, the linear axes are considered as below:

Linear axes are seven axes further including X+Y+Z, −X+Y+Z, −X−Y+Z, and X−Y+Z;

Linear axes are thirteen axes further including X+Y, −X+Y, X+Z, −X+Z, Y+Z, and −Y+Z.

The importance is a value based on variance of representative datas as described later and relates to a range in which the representative datas can be present. Thus, when data accumulated in the accumulating portion is selected, a maximum value is calculated by comparing possible smallest values of the representative datas, and a minimum value is calculated by comparing possible largest values of the representative datas. In other words, worst values that the representative datas can present are compared. According to such comparison, for example, even if a certain representative data is a large value because the representative data includes dynamic acceleration, the representative data is excluded from the accumulating portion on condition that importance is low and a minimum value among the representative data can take is smaller than a predetermined value.

An example is described when a maximum value and a minimum value on the measurement axes X, Y, and Z of the tri-axial acceleration sensor are selectively accumulated.

FIG. 3 shows an example of the structure of a buffer serving as the accumulating portion 14 suitable for accumulating maximum values and minimum values on the detection axis and the linear axis.

The accumulating portion 14 has a buffer including six or more arrays for selectively storing representative datas shown in FIG. 3.

In an array number 0, the data of (X axis measurement value −1)/(total importance 2) is stored as largest data (a representative data XMAX).

In an array number 1, the data of (X axis measurement value +1)/(total importance 2) is stored as smallest data (a representative data XMIN).

In an array number 2, the data of (Y axis measurement value −1)/(total importance 2) is stored as largest data (a representative data YMAX).

In other array numbers, data are stored in the same manner. When the number of arrays of the buffer exceeds six, representative datas may be freely stored besides the above rules.

In the buffers, the total importance 1 corresponding to the respective representative datas and temperature information and time information when acceleration data used for calculating the representative datas is obtained is also stored.

FIG. 4 shows an example of processing for selecting data stored in the accumulating portion 14.

When the data selecting portion 13 selects a representative data anew (step S1), first, the total importance 2 of the new representative data is calculated (step S2). Next, the total importance 2 of representative datas in respective arrays already stored is recalculated (steps S3 to S5). Then the new representative data and the stored representative datas of the respective arrays are compared. The comparison is performed from a smallest array number. As described above, when the new representative data is compared with a representative data in an array number i=0, the comparison is performed for following factor:

(X axis measurement value −1)/(total importance 2).

When the new representative data is compared with a representative data in an array number i=1, the comparison is performed for following factor:

(X axis measurement value +1)/(total importance 2).

In comparison with representative datas in the other arrays, comparison is performed in the same manner (steps S6 to S8).

When it is judged that the new representative data is more suitable than the representative data stored in the array as a result of the comparison, the representative data stored in the array is replaced with the new representative data. The new representative data is compared with the representative data of the next array number. When the comparison has been carried out up to an array number i=5, the selection is finished (steps S9 to S10).

In the second importance calculating portion 15, importance calculated by the importance calculating portions 15a and 15b are combined based on both the total importance 1 accumulated in the accumulating portion 14 and the temperature and time, and thus the total importance 2 is calculated.

In general, offsets and sensitivities of the acceleration sensor have temperature characteristics. In a system of estimating offsets and sensitivities by fitting to sphere or ellipsoid, when temperature fluctuates, it is necessary to collect data again from the beginning. One method to prevent once-obtained data from being wasted, a method discloses a technique that buffers are provided per a temperature unit in the accumulating portion 14. However, an excess storage area is necessitated in this method. It is unnecessary to use such a method if data after temperature fluctuation is obtained again and offsets and a reference points can be recalculated sufficiently quickly. In general, offset fluctuation in the acceleration sensor due to the temperature fluctuation is specified by the specifications of the acceleration sensor. Therefore, a worst value ($C_{Te}$) of the offset fluctuation per 1° C. can be obtained. In that case the importance calculating portion 2 calculates importance ($1/\sigma_{Te}^2$) from temperature as described below.

$$\frac{1}{\sigma_{Te}^2} = \frac{1}{|C_{Te}(T_i - T_0)|^2} \qquad \text{[Numeral 16]}$$

Here, $T_i$ and $T_0$ are a representative data stored in the accumulating portion and the present temperature (i.e., temperature at the present point during importance calculation), respectively.

When importance of the representative data in the accumulating portion is estimated lower, the temperature of a latest representative data (i.e., in most cases, the present temperature) and the temperature of the representative data stored in the accumulating portion 14 are farther apart each other representative data. The representative data with low importance accumulated in the accumulating portion tends to be replaced with a new representative data as described above (in a system for selectively accumulating a maximum value and a minimum value taking into account the total importance 1 on the detection axis and the linear axis of the acceleration sensor).

Reducing the importance of the accumulated representative data with progress of time, it is possible to follow up with a change with time of system characteristics incorporating the acceleration sensor. For example, obtained acceleration data by acceleration sensor is only a centrifugal force because gravitational acceleration is 0 when the acceleration sensor is in free-fall while rotating. Therefore, the acceleration data is not located on a sphere or an ellipsoid that should be drawn by measurement data of the gravitational acceleration. When the acceleration sensor is in free-fall while rotating for a sufficiently long time, variance calculated by the importance calculating portion is close to 0. In such case, importance becomes extremely high and obtained data is likely to remain in the accumulating portion for a long time. It is possible to put away such data in finite time by reducing the importance with progress of time. Even if the characteristic of the system is changed due to an unexpected reason, a representative data accumulated in the accumulating portion can be replaced within the finite time.

The second importance calculating portion 15 calculates importance ($1/\sigma_{ti}^2$) from time information, for example, as described below.

$$\frac{1}{\sigma_{ti}^2} = \frac{1}{|C_{ti}(t_i - t_0)|} \quad \text{[Numeral 17]}$$

Here, $t_i$ and $t_0$ are representative datas stored in the accumulating portion and the present time (i.e., time at the point of importance calculation) respectively, and $C_{ti}$ is a proportional coefficient.

Finally, total importance 2 is calculated by combining the total importance 1, the importance calculated from temperature information (numeral 16) and the importance calculated from time information (numeral 17).

For example, $$\frac{1}{\text{Total importance 2}} = \frac{1}{\text{Total importance 1}} + \frac{1}{\sigma_{Te}^2} + \frac{1}{\sigma_{ti}^2} \quad \text{[Numeral 18]}$$

In the first reference point estimating means, offsets and sensitivities of the acceleration sensor are calculated by using the representative data accumulated in the accumulating portion and the total importance 2 calculated by the importance calculating potion 2.

When sensitivities on the respective axes of the acceleration sensor are the same (r), offsets and sensitivities of the acceleration detecting means are calculated based on the following formula by using measurement values ($x_i$, $y_i$, $z_i$) of N acceleration sensors.

$$\begin{bmatrix} \sum_{i=1}^{N} \frac{1}{\sigma_i^2} x_i(x_i - \hat{x}) & \sum_{i=1}^{N} \frac{1}{\sigma_i^2} y_i(x_i - \hat{x}) & \sum_{i=1}^{N} \frac{1}{\sigma_i^2} z_i(x_i - \hat{x}) \\ \sum_{i=1}^{N} \frac{1}{\sigma_i^2} y_i(x_i - \hat{x}) & \sum_{i=1}^{N} \frac{1}{\sigma_i^2} y_i(y_i - \hat{y}) & \sum_{i=1}^{N} \frac{1}{\sigma_i^2} z_i(y_i - \hat{y}) \\ \sum_{i=1}^{N} \frac{1}{\sigma_i^2} z_i(x_i - \hat{x}) & \sum_{i=1}^{N} \frac{1}{\sigma_i^2} z_i(y_i - \hat{y}) & \sum_{i=1}^{N} \frac{1}{\sigma_i^2} z_i(z_i - \hat{z}) \end{bmatrix} \quad \text{[Numeral 19]}$$

$$\begin{bmatrix} x_0 \\ y_0 \\ x_0 \end{bmatrix} = \frac{1}{2} \begin{bmatrix} \sum_{i=1}^{N} \frac{1}{\sigma_i^2}(x_i^2 + y_i^2 + z_i^2)(x_i - \hat{x}) \\ \sum_{i=1}^{N} \frac{1}{\sigma_i^2}(x_i^2 + y_i^2 + z_i^2)(y_i - \hat{y}) \\ \sum_{i=1}^{N} \frac{1}{\sigma_i^2}(x_i^2 + y_i^2 + z_i^2)(z_i - \hat{z}) \end{bmatrix}$$

$$:\Leftrightarrow A_N X_N = B_N$$

$$r^2 = \frac{\sum_{i=1}^{N} \frac{1}{\sigma_i^2}\{(x_i - x_0)^2 + (y_i - y_0)^2 + (z_i - z_0)^2\}}{\sum_{i=1}^{N} \frac{1}{\sigma_i^2}} \quad \text{[Numeral 20]}$$

Here, for example, $$\hat{x} = \sum_{i=1}^{N} \frac{x_i}{\sigma_i^2} \bigg/ \sum_{i=1}^{N} \frac{1}{\sigma_i^2} \quad \text{[Numeral 21]}$$

$\sigma_i^2$ represents variance of si of the following formula (i.e., the square of a distance between a sphere that should be drawn by gravitational acceleration data and actual acceleration data) with respect to the respective measurement values ($x_i$, $y_i$, $z_i$)

$$\epsilon_i = (x_i - x_0)^2 + (y_i - y_0)^2 + (z_i - z_0)^2 - r^2 \quad \text{[Numeral 22]}$$

(Numeral 19) and (numeral 20) show that data including larger variance has smaller influence to calculate offset and sensitivity variance.

When variances of all the acceleration data are set to 1, offsets and sensitivities are the same as values calculated by the method of (numeral 6) and (numeral 7).

When there is a sensitivity difference between the respective measurement axes of the acceleration sensor, offsets and sensitivities of the acceleration detecting portion 1 are calculated as follows by using the measurement values ($x_i$, $y_i$, $z_i$) of the N acceleration sensors.

First, parameters B, C, D, E, F, and G are calculated by the following formula:

$$\begin{bmatrix} m_{YY} & m_{YZ} & m_{YU} & m_{YV} & m_{YW} \\ m_{ZY} & m_{ZZ} & m_{ZU} & m_{ZV} & m_{ZW} \\ m_{UY} & m_{UZ} & m_{UU} & m_{UV} & m_{UW} \\ m_{VZ} & m_{VZ} & m_{VU} & m_{VV} & m_{VW} \\ m_{WY} & m_{WZ} & m_{WU} & m_{WV} & m_{WW} \end{bmatrix} \begin{bmatrix} B \\ C \\ D \\ E \\ F \end{bmatrix} = -\begin{bmatrix} m_{YX} \\ m_{ZX} \\ m_{UX} \\ m_{VX} \\ m_{WX} \end{bmatrix} \quad \text{[Numeral 23]}$$

$$:\Leftrightarrow M_N P_N = Q_N$$

-continued $$G = \hat{X} + B\hat{Y} + C\hat{Z} + D\hat{U} + E\hat{V} + F\hat{W}$$

$$\begin{pmatrix} X_i = x_i^2, Y_i = y_i^2, Z_i = z_i^2, \\ U_i = x_i, V_i = y_i, W_i = z_i, \\ m_{\mu\nu} = \sum_{i=1}^{N} \frac{1}{\sigma_i^2} \mu_i(v_i - \hat{v}), \\ \hat{v} = \sum_{i=1}^{N} \frac{v_i}{\sigma_i^2} \bigg/ \sum_{i=1}^{N} \frac{1}{\sigma_i^2} \end{pmatrix}$$

Next, offsets and sensitivities are calculated by the following formula:

$$x_0 = -\frac{D}{2}, y_0 = -\frac{E}{2B}, z_0 = -\frac{F}{2C},$$ [Numeral 24]

$$r_x^2 = G + x_0^2 + By_0^2 + Cz_0^2, r_y^2 = \frac{r_x^2}{B}, r_z^2 = \frac{r_x^2}{C}$$

$\sigma_i^2$ represents variance of $\epsilon_i$ of the following formula with respect to the respective measurement values ($x_i$, $y_i$, $z_i$).

$$\epsilon_i = X_i + BY_i + CZ_i + DU_i + EV_i + FW_i - G$$ [Numeral 25]

(Numeral 23) indicates that influence of data including larger variance is smaller when offsets and sensitivities are calculated.

When variances of all the acceleration data are set to 1, offsets and sensitivities are the same as values calculated by the method of (numeral 11) and (numeral 12).

The offset correcting portion 4 calculates corrected true acceleration value by correcting the data obtained by the acceleration data obtaining portion 2 with the offsets and the sensitivities estimated by the first reference point estimating portion 16.

The correction is performed by inverting (numeral 1) as follows.

$$\begin{cases} a_x = \dfrac{x - x_o}{r_x} \\ a_y = \dfrac{y - y_o}{r_y} \\ a_z = \dfrac{z - z_o}{r_z} \end{cases}$$ [Numeral 26]

As explained above, a representative data of an obtained group of a predetermined number M of acceleration data is calculated, first importance of the representative data is calculated, it is selected whether the representative data is appropriate, and the selected representative data and the first importance and additional information (time, temperature, etc.) corresponding to the representative data are accumulated. Second importance corresponding to the representative data is calculated based on the first importance and the additional information corresponding to the accumulated representative data. A reference point defined on a two dimensional orthogonal coordinate plane or a three dimensional orthogonal coordinate space and scale reference of respective axes are estimated based on both a distribution on the two dimensional orthogonal coordinate plane or the three dimensional orthogonal coordinate space when respective axial components of an accumulated predetermined number N of representative datas are set as coordinate values and a predetermined number N of second importances corresponding to the representative datas.

Thus, it is unnecessary to discard all data obtained so far and obtain data again in a long time, even though temperature is altered and offsets are clearly changed. Therefore, it is possible to quickly estimate offsets or both of offsets and sensitivities when the temperature of the acceleration measuring device is changed.

Third Embodiment

Figure 5:
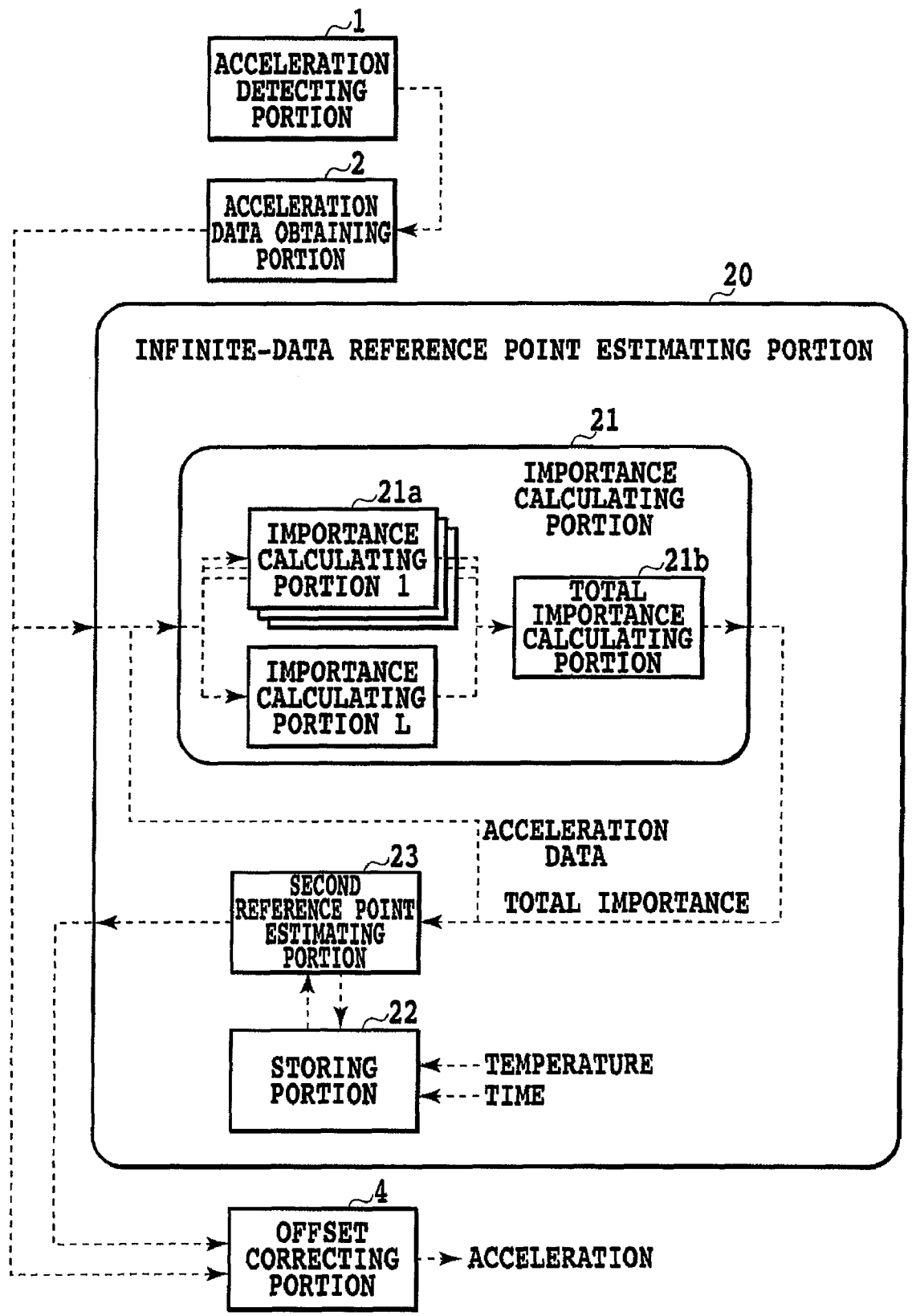
FIG. 5 is a block diagram showing an example of the structure of an acceleration measuring device having a finite data reference point estimating portion according to a third embodiment of the present invention.

A third embodiment of the present invention is explained on the basis of FIG. 5. Explanation of components same as those in the respective embodiments described above is omitted and the components are denoted by the same reference numerals and signs.

(Infinite DOE)
<Structure>
FIG. 5 shows an example of the structure of an acceleration measuring device according to the present invention.

The acceleration measuring device includes the acceleration detecting portion 1, the acceleration data obtaining portion 2, an infinite data reference point estimating portion 20, and the offset correcting portion 4. In the following explanation, explanation of the components other than the infinite data reference point estimating portion 20 is omitted.

The infinite data reference point estimating portion 20 is explained.

The infinite data reference point estimating portion 20 includes an importance calculating portion 21, a storing portion 22, and a second reference point estimating portion 23.

The importance calculating portion 21 consisted of L of importance calculating portions (1 to L) 21$a$ and a total importance calculating portion 21$b$. The importance calculating portion 21 calculates importance of two-axis or three-axis respective acceleration data such that importance pertaining to the acceleration data group are obtained based on acceleration data obtained by the acceleration data obtaining portion 2.

The storing portion 22 stores the number of groups of acceleration data weighted by the importance of the acceleration data group obtained by the acceleration data obtaining portion 2, a sum of respective axial components weighted by the importance of the acceleration data group, a sum of values obtained by weighting squares of the respective axial components of the acceleration data group with the importance, a coefficient group of simultaneous equations for calculating the reference point and the scale reference of the respective axes, and the reference point and the reference length.

The second reference point estimating portion 23 estimates the reference point and the scale reference of the respective axes based on latest data obtained by the acceleration data obtaining portion 2, importance calculated by the importance calculating portion 21 corresponding to the data, and the latest various processed data stored by the storing portion 22.

<Operations>
Operations of the device are explained.

Offsets and sensitivities of an acceleration sensor are calculated based on the fact that gravitational acceleration data are distributed on a spherical surface or an ellipsoidal surface.

However, usually, dynamic acceleration is also included in measured acceleration data and causes an error when offset and sensitivity are estimated. In an application in which an acceleration sensor is incorporated in a cellular phone or a PDA (hereinafter collectively referred to as portable terminal) and is used for pedestrian navigation, dynamic acceleration of the portable terminal faces various directions with respect to the terminal. It is expected that acceleration is distributed as a center of a spherical surface or an ellipsoidal surface that the gravitational acceleration is distributed. In other words, if the number of acceleration data used for estimation of offset and sensitivity is set in large enough, it is expected that a spherical surface or an ellipsoidal surface to which the method of (numeral 19) and (numeral 20) or the method of (numeral 22) to (numeral 24) is applied is the same as the distribution as a center of the spherical surface or the ellipsoidal surface on which the gravitational acceleration is distributed.

If (numeral 19) and (numeral 20) or (numeral 22) to (numeral 24) are directly applied, when the number of data increases, processing time for the data increases and a storage area for the data also increases. In particular, in a small system such as a portable terminal, a sufficient number of data cannot be processed. By applying a method described bellow, an infinite number of data can be processed in a finite data processing time and a finite data storage area (actually, the number of data depends on a bit length of data processing).

In generally, when fitting the data to a spherical surface, an example of N+1 data is described below. A component $a_{N+1}$ in a first column in a second row of a coefficient matrix $A_{N+1}$ and a component $b_{N+1}$ in a first row of a coefficient matrix $B_{N+1}$ as shown in (numeral 19) can be modified, and $r_{N+1}^2$ as shown in (numeral 20) can be modified as follows:

$$a_{21_{N+1}} = a_{21_N} - \frac{1}{\sum_{i=1}^{N} \frac{1}{\sigma_i^2} + \frac{1}{\sigma_{N+1}^2}} \left( \sum_{i=1}^{N} \frac{y_i}{\sigma_i^2} + \frac{y_{N+1}}{\sigma_{N+1}^2} \right) \left( \sum_{i=1}^{N} \frac{x_i}{\sigma_i^2} + \frac{x_{N+1}}{\sigma_{N+1}^2} \right) + \frac{1}{\sum_{i=1}^{N} \frac{1}{\sigma_i^2}} \sum_{i=1}^{N} \frac{y_i}{\sigma_i^2} \sum_{i=1}^{N} \frac{x_i}{\sigma_i^2} + \frac{1}{\sigma_{N+1}^2} y_{N+1} x_{N+1}$$ [Numeral 27]

$$2b_{1_{N+1}} = 2b_{1_N} + \left( \sum_{i=1}^{N} \frac{1}{\sigma_i^2}(x_i^2 + y_i^2 + x_i^2) \right) \left( \frac{\sum_{i=1}^{N} \frac{x_i}{\sigma_i^2}}{\sum_{i=1}^{N} \frac{1}{\sigma_i^2}} - \frac{\sum_{i=1}^{N} \frac{x_i}{\sigma_i^2} + \frac{x_{N+1}}{\sigma_{N+1}^2}}{\sum_{i=1}^{N} \frac{1}{\sigma_i^2} + \frac{1}{\sigma_{N+1}^2}} \right) + \frac{1}{\sigma_{N+1}^2}(x_{N+1}^2 + y_{N+1}^2 + z_{N+1}^2) \left( x_{N+1} - \frac{\sum_{i=1}^{N} \frac{x_i}{\sigma_i^2} + \frac{x_{N+1}}{\sigma_{N+1}^2}}{\sum_{i=1}^{N} \frac{1}{\sigma_i^2} + \frac{1}{\sigma_{N+1}^2}} \right)$$ [Numeral 28]

$$r_{N+1}^2 \sum_{i=1}^{N+1} \frac{1}{\sigma_i^2} = r_N^2 \sum_{i=1}^{N} \frac{1}{\sigma_i^2} + 2(x_{o_N} - x_{o_{N+1}}) \sum_{i=1}^{N} \frac{x_i}{\sigma_i^2} + 2(y_{o_N} - y_{o_{N+1}}) \sum_{i=1}^{N} \frac{y_i}{\sigma_i^2} + 2(z_{o_N} - z_{o_{N+1}}) \sum_{i=1}^{N} \frac{z_i}{\sigma_i^2} - (x_{o_N}^2 + y_{o_N}^2 + x_{o_N}^2) \sum_{i=1}^{N} \frac{1}{\sigma_i^2} + (x_{o_{N+1}}^2 + y_{o_{N+1}}^2 + z_{o_{N+1}}^2) \sum_{i=1}^{N} \frac{1}{\sigma_i^2} + \frac{1}{\sigma_{N+1}^2} \{(x_{N+1} - x_{o_{N+1}})^2 (y_{N+1} - y_{o_{N+1}})^2 + (z_{N+1} - z_{o_{N+1}})^2\}$$ [Numeral 29]

In other words, values as shown in (numeral 32) can be calculated based on several processed data comprised of N data (numeral 30) and N+1th data (numeral 31).

Processed data comprised of N data:

$$\begin{cases} A_N, B_N, \sum_{i=1}^{N} \frac{1}{\sigma_i^2}, \sum_{i=1}^{N} \frac{x_i}{\sigma_i^2}, \sum_{i=1}^{N} \frac{y_i}{\sigma_i^2}, \sum_{i=1}^{N} \frac{z_i}{\sigma_i^2}, \\ \sum_{i=1}^{N} \frac{1}{\sigma_i^2}(x_i^2 + y_i^2 + z_i^2), r_N^2, x_{o_N}, y_{o_N}, z_{o_N} \end{cases}$$ [Numeral 30]

N+1th data:

$\sigma_{N+1}, x_{N+1}, y_{N+1}, z_{N+1}1$ [Numeral 31]

$A_{N+1}, B_{N+1}, r_{N+1}^2$ [Numeral 32]

can be calculated.

When fitting the data to an ellipsoidal surface, an example of N+1 data is described below. A component $m_{N+1}$ in a first column of a second row of a coefficient matrix $M_{N+1}$ as shown in (numeral 22) can be modified as follows:

$$m_{21_{N+1}} = m_{21_N} - \frac{1}{\sum_{i=1}^{N} \frac{1}{\sigma_i^2} + \frac{1}{\sigma_{N+1}^2}} \left( \sum_{i=1}^{N} \frac{Z_i}{\sigma_i^2} + \frac{Z_{N+1}}{\sigma_{N+1}^2} \right) \left( \sum_{i=1}^{N} \frac{Y_i}{\sigma_i^2} + \frac{Y_{N+1}}{\sigma_{N+1}^2} \right) + \frac{1}{\sum_{i=1}^{N} \frac{1}{\sigma_i^2}} \sum_{i=1}^{N} \frac{Z_i}{\sigma_i^2} \sum_{i=1}^{N} \frac{Y_i}{\sigma_i^2} + \frac{1}{\sigma_{N+1}^2} Z_{N+1} Y_{N+1}$$ [Numeral 33]

In other words, values as shown in (numeral 36) can be calculated based on processed data comprised of N data (numeral 34) and N+1th data (numeral 35).

Processed data formed of N data:

$$M_N, Q_N, \sum_{i=1}^{N} \frac{1}{\sigma_i^2}, \sum_{i=1}^{N} \frac{X_i}{\sigma_i^2}, \sum_{i=1}^{N} \frac{Y_i}{\sigma_i^2},$$
$$\sum_{i=1}^{N} \frac{Z_i}{\sigma_i^2}, \sum_{i=1}^{N} \frac{U_i}{\sigma_i^2}, \sum_{i=1}^{N} \frac{V_i}{\sigma_i^2}, \sum_{i=1}^{N} \frac{W_i}{\sigma_i^2}$$ [Numeral 34]

N+1th data:

$\sigma_{N+1}, X_{N+1}, Y_{N+1}, Z_{N+1}, U_{N+1}, V_{N+1}, W_{N+1}$ [Numeral 35]

Values:

$M_{N+1}, Q_{N+1}$ [Numeral 36]

can be calculated.

According to the method described above, it is possible to continue to obtain new offsets and sensitivities inductively based on several processed data even if the number of data used for estimation of the offset and sensitivity increases.

In the above method, when offsets are changed due to a temperature alteration, only data before the temperature alteration cannot be deleted since measurement data is not stored.

However, the influence of measured data in the past can be reduced by reducing importance of all measured data in the past at the same ratio. When importance of N measured data in the past are changed from $1/\sigma^2$ to $1/(k\sigma)^2$, a value obtained by multiplying all the processed data excluding $r_N^2$, $x_{oN}$, $y_{oN}$, and $Z_{oN}$ of (numeral 30) with $1/k^2$ is set as new processed data (in the case of a matrix, respective components of the matrix are multiplied with $1/k^2$) in the case of spherical fitting.

Similarly, in the ellipsoid fitting case, a value obtained by multiplying all the processed data of (numeral 34) with $1/k^2$ is set as new processed data (in the case of a matrix, respective components are multiplied with $1/k^2$).

The storing portion 22 stores data represented by (numeral 30) or (numeral 34).

Offsets and sensitivities of acceleration sensor may fluctuate during acceleration measurement because of a reason such as a temperature alteration. When it is desired to reduce the influence of past data in such a case, importance of the past data is reduced at an appropriate point. For example, if the importance is reduced every time new data is obtained, the influence of the past data can be eliminated with certain time constant. Or it is also effective that the influence can be reduced by every predetermined period time set in advance passes.

When it is confident that temperature fluctuates a lot, the importance of the past data may be reduced rapidly. As an example, the temperature fluctuation can be defined as a case that, when the temperature data immediately after temperature fluctuation occurred last time is stored and the difference between stored temperature and present temperature becomes equal to or larger than a predetermined value set. As another example, temperature fluctuation can be defined as a case that, when a maximum value and a minimum value of temperature are stored from immediately after temperature fluctuation occurred last time and a difference between the stored maximum value and the stored minimum value becomes equal to or larger than a predetermined value set in advance. The reduction of importance may be performed not only by physical factor such as temperature but also based on a demand from a system that realizing numerical value calculation. In other words, values in a form of a sum of measurement values in the processed data in (numeral 30) or (numeral 34) increase as the number of measurement data increases. Since a bit width in a CPU for data processing and a data size in a storage memory is limited, it is necessary to periodically reduce a size of processed data.

The importance calculating portion 21 calculates importance of the obtained acceleration data. The estimation of offset and sensitivity may be performed on condition that $\sigma^2$ of all the measurement data is set to 1. However, convergence of offsets and sensitivities is faster when $\sigma^2(=1/\text{total importance})$ is appropriately set.

Importance are calculated by different plural methods and are combined by the total importance calculating portion. As a result, total importance is calculated.

In order to calculate offsets and sensitivities faster, i.e., with small number of acceleration data, importance of data including a lot of dynamic acceleration should be set lower. An example of importance of acceleration data calculation is described below. Variances on respective axes of a group of a predetermined number of acceleration data continuously obtained are calculated. Importance is set lower when a sum of the variances on the respective axes is large. Conversely, importance is set high when the sum is small. The importance can also be calculated from a maximum value of the variances on the respective axes.

The importance may be calculated by a square sum of differences between maximum values and minimum values on respective axes of a predetermined number of data. Or the importance may be calculated also by the square of a maximum value of the differences between the maximum values and the minimum values on the respective axes. When the present invention is incorporated in a system that has only limited calculation ability, it is preferable to calculate importance based on the maximum values and the minimum values than to calculate variances. For example, the importance $(1/\sigma_1^2)$ is calculated by the following formula:

$$\text{Importance} = \frac{1}{\sigma_1^2} = \begin{cases} \frac{1}{(\sigma_x^2 + \sigma_y^2 + \sigma_z^2)/r_a^2}, \\ \frac{1}{(\max(\sigma_x^2, \sigma_y^2, \sigma_z^2))/r_a^2}, \\ \frac{1}{((x_{max} - x_{min})^2 + (y_{max} - y_{min})^2 + (z_{max} - z_{min})^2)/r_a^2}, \\ \frac{1}{(\max((x_{max} - x_{min})^2, (y_{max} - y_{min})^2, (z_{max} - z_{min})^2))/r_a^2} \end{cases}$$ [Numeral 37]

Here, $\sigma_x$, $\sigma_y$, $\sigma_z$ are the variances on the respective axes. Further, $x_{max}$, $x_{min}$, $y_{max}$, $y_{min}$, $z_{max}$, and $z_{min}$ are the maximum values and the minimum values of the respective axis measurement values, respectively, and $r_a$ is a constant for normalization.

Offsets and sensitivities estimated from a group of acceleration data including many acceleration data of the same attitude at the stationary time often include large errors. In an extreme case, offsets estimated from a group of acceleration data including only acceleration data of the same attitude at the stationary time, i.e. the acceleration data consisted of gravitational acceleration determined by an attitude+noise, have substantially the same value as the group of acceleration data itself. In such case, offsets are estimated just on a spherical surface or on an ellipsoidal surface that are intended to be calculated. Therefore, importance of acceleration data obtained in the stationary state or a state close to the stationary state must be set in low.

Importance of acceleration data can be calculated, for example, as described below. Variances on respective axes of a group of a predetermined number of acceleration data continuously obtained are calculated. Importance is set high when a sum of the variances on the respective axes is large. Conversely, importance is set low when the sum is small. The importance can also be calculated based on a maximum value of the variances on the respective axes.

The importance may be calculated also by other means. The other way is calculate a square sum of differences between maximum values and minimum values on respective axes of a predetermined number of data. Another way is to calculate the square of a maximum value of the differences between the maximum values and the minimum values on the respective axes. When the present invention is applied to a system that has only a limited calculation ability, it is more preferable to calculate importance based on the maximum values and the minimum values than to calculate variances. When the predetermined number is 2, the square sum of the variances on the respective axes represents a square of a distance on a measurement space between two acceleration data. For example, the importance $(1/\sigma_2^2)$ is calculated by the following formula:

$$\text{Importance} = \frac{1}{\sigma_2^2} = \begin{cases} (\sigma_x^2 + \sigma_y^2 + \sigma_z^2)/r_a^2, \\ (\max(\sigma_x^2, \sigma_y^2, \sigma_z^2))/r_a^2, \\ ((x_{max} - x_{min})^2 + (y_{max} - y_{min})^2 + (z_{max} - z_{min})^2)/r_a^2, \\ (\max((x_{max} - x_{min})^2, (y_{max} - y_{min})^2, (z_{max} - z_{min})^2))/r_a^2 \end{cases}$$ [Numeral 38]

Here, $\sigma_x$, $\sigma_y$, $\sigma_z$ are the variances on the respective axes. Further, $x_{max}$, $x_{min}$, $y_{max}$, $y_{min}$, $z_{max}$, and $z_{min}$ are the maximum values and the minimum values of the respective axis measurement values, respectively, and $r_a$ is a constant for normalization.

Actually, both importances of acceleration data including large dynamic acceleration and acceleration data at the stationary time need to be set lower. Then a sum of importance independently calculated by the two methods described above is deal as total importance and used for estimation of offset and sensitivity.

$$\frac{1}{\text{Total importance}} = \frac{1}{\text{Total importance1}} + \frac{1}{\text{Total importance2}}$$ [Numeral 39]

The second reference point estimating portion 23 estimates offsets and sensitivities of the acceleration sensor using the processed data stored in the storing portion 22, newly obtained acceleration data, and total importance of the acceleration data.

Forth Embodiment

Figure 6:
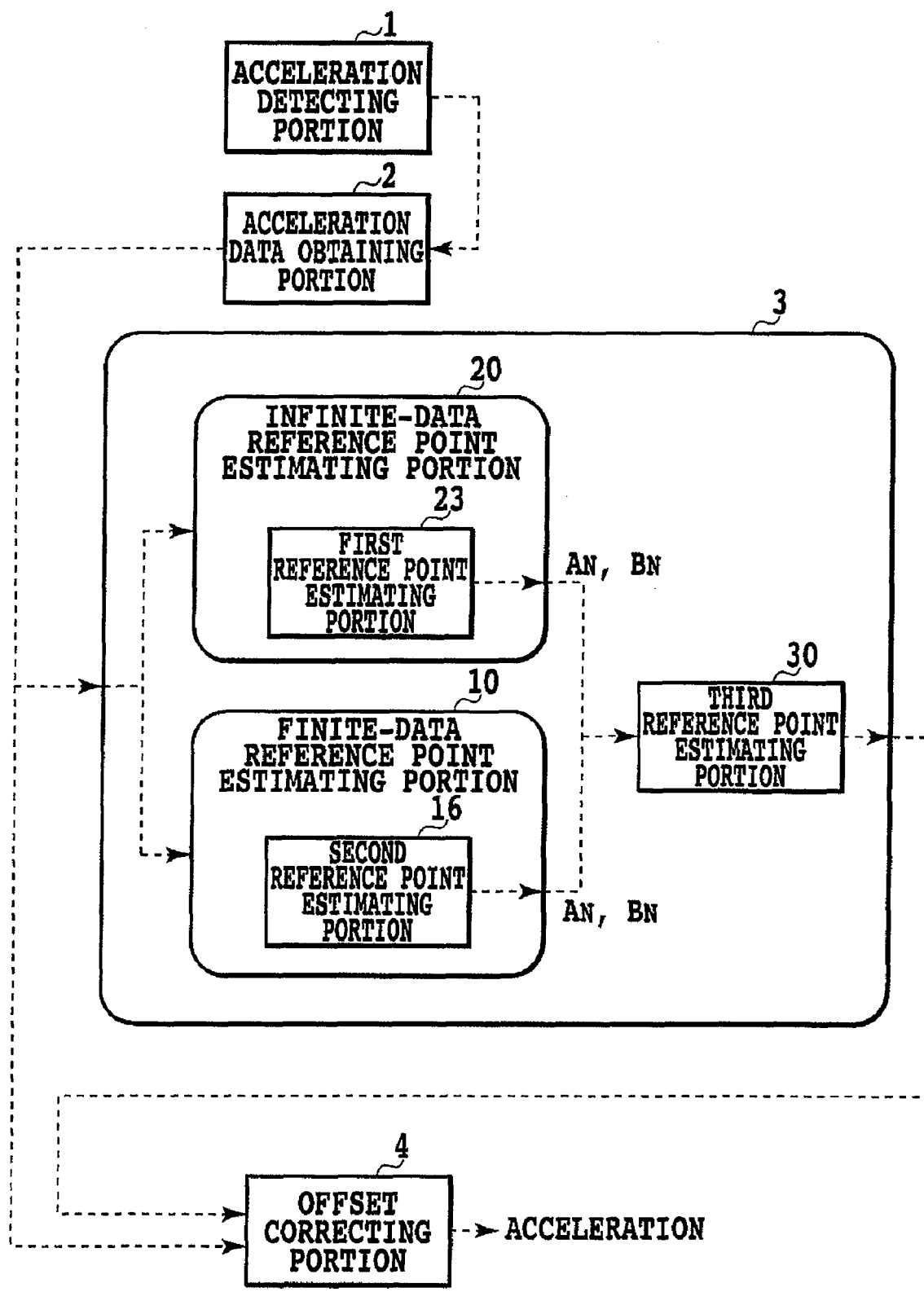
FIG. 6 is a block diagram showing an example of the structure of an acceleration measuring device having infinite data and finite data reference point estimating portions according to a fourth embodiment of the present invention.
Figure 7A:
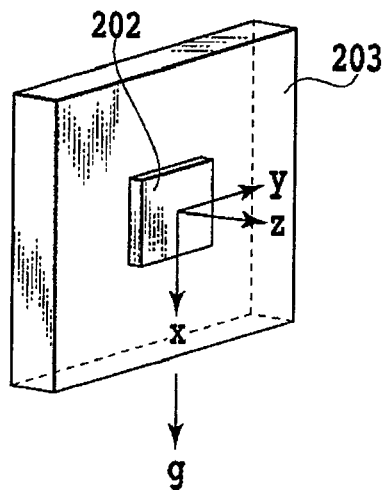
FIG. 7A is an explanatory diagram showing a method of measuring a predetermined axial direction component in a conventional acceleration measuring device.
Figure 7B:
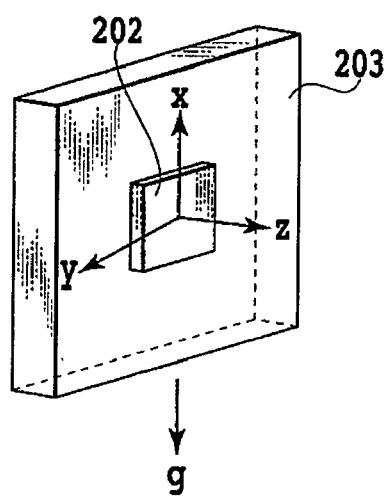
FIG. 7B is an explanatory diagram showing the method for measuring a the acceleration components of predetermined axis in the conventional acceleration measuring device.
Figure 7C:
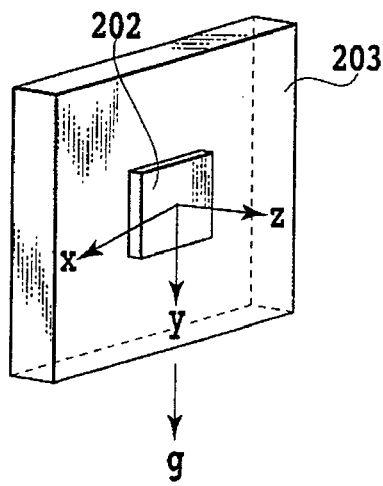
FIG. 7C is an explanatory diagram showing the method for measuring a predetermined axial direction component in the conventional acceleration measuring device.
Figure 7D:
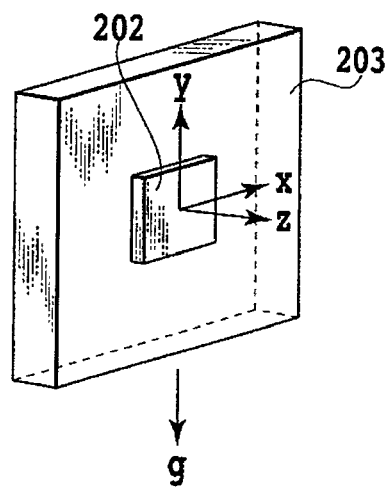
FIG. 7D is an explanatory diagram showing the method for measuring a predetermined axial direction component in the conventional acceleration measuring device.
Figure 7E:
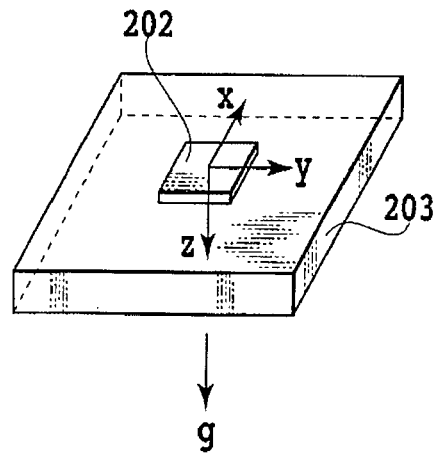
FIG. 7E is an explanatory diagram showing the method for measuring a predetermined axial direction component in the conventional acceleration measuring device.
Figure 7F:
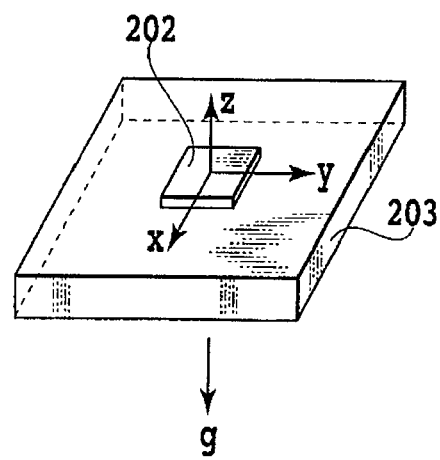
FIG. 7F is an explanatory diagram showing the method for measuring a predetermined axial direction component in the conventional acceleration measuring device.

A fourth embodiment of the present invention is explained based on FIG. 6. Explanation of components same as those in the respective embodiments described above is omitted and the components are denoted by the same reference numerals and signs.

(Finite data+infinite data DOE)
<Structure>

FIG. 6 shows an example of the structure of an acceleration measuring device according to the present invention.

The acceleration measuring device includes the acceleration detecting portion 1, the acceleration data obtaining portion 2, the estimating portion 3, and the offset correcting portion 4.

In this embodiment, the estimating portion 3 includes the finite data reference point estimating portion 10 explained in the second embodiment (see FIG. 2), the infinite data reference point estimating portion 20 in the third embodiment (see FIG. 5), and a third reference point estimating portion 30.

The third reference point estimating portion estimates a reference point and scale reference of respective axes based on matrixes $A_N$ and $B_N$ of (numeral 19) or $M_N$ and $N_N$ of (numeral 22) calculated by the first reference point estimating portion of the finite data reference point estimating portion and the second reference point estimating portion of the infinite data reference point estimating portion, respectively.

<Operations>
Operations of the device are explained.

Offsets and sensitivities estimated by the infinite data reference point estimating portion 20 are values estimated on the assumption that acceleration data is distributed with a center on a spherical surface or an ellipsoidal surface that gravitational acceleration is distributed. However, there is no guarantee that the assumption is always correct. Therefore, necessary period for estimating the offsets and sensitivities by the infinite data reference point estimating portion 20 is enough short but accuracy of the estimation is not always guaranteed.

On the other hand, the finite data reference point estimating portion 10 selects only acceleration data close to the stationary state by setting selection conditions strictly in the data selecting portion 13. Then the accuracy of estimated offsets and sensitivities is enough high. However, it takes long time to collect stationary data and then long time for estimating the offsets and sensitivities.

Then It is preferable to combine advantages of these two reference point estimating means (the finite data reference point estimating portion 10 and the infinite data reference point estimating portion 20). That is, after oddest and sensitivity correction processing is started, first the infinite data reference point estimating portion 20 operates for estimating offsets and sensitivities, and then, after enough amount of stationary data are obtained, the finite data reference point estimating portion 10 operates. By this means offsets and sensitivities can be quickly obtained at first, and finally those are estimated with high accuracy.

These two reference point estimating means may be switched at a certain point. Also it may be shifted gradually from one reference point estimating means to another. In this case it is possible to smoothly shift to offsets and sensitivities correction from quickly obtained one to accurate one with progress of time.

One example, in the case of the spherical fitting, both the reference point estimating means resultantly calculate the coefficient matrixes $A_N$ and $B_N$ of (numeral 19). Coefficient matrixes calculated by the infinite data reference point estimating portion 20 are represented as $A_{Ninf}$ and $B_{Ninf}$. Coefficient matrixes calculated by the finite data reference point estimating portion 10 are represented as $A_{Nlim}$ and $B_{Nlim}$. Further, "k" is a coefficient ($0 \leq k \leq 1$). In this case, the third reference point estimating portion 30 may calculate offsets and sensitivities using the following coefficient matrixes $A_{Nfus}$ and $B_{Nfus}$.

$$\begin{cases} A_{N_{fus}} = (1-k)\frac{A_{N_{inf}}}{|A_{N_{inf}}|} + k\frac{A_{N_{lim}}}{|A_{N_{lim}}|} \\ B_{N_{fus}} = (1-k)\frac{B_{N_{inf}}}{|A_{N_{inf}}|} + k\frac{B_{N_{lim}}}{|A_{N_{lim}}|} \end{cases}$$ [Numeral 40]

|A| represents a determinant of matrix A and is set for normalizing respective matrixes. However, method using determinant is not suitable for a system that only an integer processing is supported because it takes long time to calculate the determinant and, in general, a dynamic range of the determinant is large. This phenomenon often occurs in a small system. Even if a method of normalization of a matrix is slightly different, the start point and end point of the normalization are the same. Only a progress is different after calculating offsets and sensitivities. Therefore, it is not important in that the determinant is strictly calculated. As an alternative method, for example, a maximum value of diagonal components of matrix A only may be used instead of the determinant.

Coefficient "k" is set to 0 at the beginning and brought close to 1 as stationary data is collected. "k" is calculated, for example, as described below. In general, acceleration sensors have different sensitivity on each measurement axes, but if a model number is determined, the acceleration sensors take similar sensitivity behavior. Let's consider the case that when the finite data reference point estimating portion 10 selectively accumulates maximum values and minimum values on the three-axis measurement axes X, Y, and Z of the acceleration sensor. As a volume formed by six measurement data becomes larger, the measurement points are distributed in a wide area.

In such case accuracy of offsets and sensitivities estimated from such a group of acceleration data is improved. The maximum of the value between maximum values and minimum values in measurement values on the respective axes is twice of sensitivity for gravitational acceleration of the acceleration sensor.

Consequently, "k" is calculated as follows:

$$k = \begin{cases} \dfrac{\left(x_{max} - \dfrac{1}{\sigma_{x\,max}}\right) - \left(x_{min} - \dfrac{1}{\sigma_{x\,min}}\right)}{2r} \times \\ \dfrac{\left(y_{max} - \dfrac{1}{\sigma_{y\,max}}\right) - \left(y_{min} - \dfrac{1}{\sigma_{y\,min}}\right)}{2r} \times \\ \dfrac{\left(z_{max} - \dfrac{1}{\sigma_{z\,max}}\right) - \left(z_{min} - \dfrac{1}{\sigma_{z\,min}}\right)}{2r}, & \text{if } 0 \le k \le 1 \\ 0, & \text{if } k < 0 \\ 1, & \text{if } 1 < k \end{cases}$$

[Numeral 41]

The invention claimed is:

1. An acceleration measuring device, comprising:
   acceleration detecting means for detecting accelerations in two-axis or three-axis directions;
   acceleration data obtaining means for obtaining two-axis or three-axis acceleration data detected by the acceleration detecting means;
   importance calculating means for calculating importance of the acceleration data obtained by the acceleration data obtaining means;
   reference point estimating means for estimating a reference point defined on a two dimensional or three dimensional orthogonal coordinate space and scale reference of the respective axes based on both a distribution of respective axial components of the acceleration data in a group of two-axis or three-axis acceleration data obtained by the acceleration data obtaining means on the two dimensional orthogonal coordinate space or the three dimensional orthogonal space and a group of importance including importance of different values calculated by the importance calculating means corresponding to the group of two-axis or three-axis acceleration data; and
   offset correcting means for correcting the respective acceleration data obtained by the acceleration data obtaining means, based on the reference point and the scale reference of the respective axes estimated by the estimating means.

2. An acceleration measuring device of claim 1, wherein
   the reference point estimating means defines a circle on the two dimensional orthogonal coordinate plane or a spherical surface on the three dimensional orthogonal coordinate space based on both the distribution of a group of two-axis or three-axis acceleration data obtained by the acceleration data obtaining means on the two dimensional orthogonal coordinate plane or the three dimensional orthogonal coordinate space and the group of importance calculated by the importance calculating means pertaining to the acceleration data group, estimates a coordinate of center point and a radius of the circle or the sphere, sets the estimated coordinate of center point as the reference point, and sets the radius as the scale reference of the respective axes, and
   the offset correcting means corrects offsets of the two-axis or three-axis acceleration data based on the reference point estimated by the reference point estimating means.

3. An acceleration measuring device of claim 1, wherein
   the reference point estimating means may define an ellipse on the two dimensional orthogonal coordinate plane or an ellipsoidal surface on the three dimensional orthogonal coordinate space based on both the distribution of the group of two-axis or three-axis acceleration data obtained by the acceleration data obtaining means on the two dimensional orthogonal coordinate plane or the three dimensional orthogonal coordinate space and the group of importance calculated by the importance calculating means pertaining to the acceleration data group, estimates a coordinate of center point and radiuses of respective principal axes of the ellipse or the ellipsoidal surface, sets the estimated coordinate of center point as the reference point, and sets the radiuses of the respective principal axes as the scale reference of the respective axes, and
   the offset correcting means corrects offsets and sensitivities of the respective two-axis or three-axis acceleration data based on the reference point and the scale reference of the respective axes estimated by the reference point estimating means.

4. An acceleration measuring device of claim 1, wherein
   the reference point estimating means includes:
   representative data calculating means for calculating a representative data of a group of a predetermined number M of acceleration data obtained by the acceleration data obtaining means;
   first importance calculating means for calculating first importance of the representative data calculated by the representative data calculating means;
   accumulating means for accumulating both the representative data calculated by the representative data calculating means and the first importance according to the representative data and additional information; and
   second importance calculating means for calculating second importance according to the representative data based on both the first importance according to the representative data and the additional information accumulated in the accumulating means, and
   the reference point estimating means estimates the reference point defined on the two dimensional orthogonal coordinate plane or the three dimensional orthogonal coordinate space and the scale reference of the respective axes based on both a distribution on the two dimensional orthogonal coordinate plane or the three dimensional orthogonal coordinate space when respective axial components of a predetermined number N of representative datas accumulated by the accumulating means are defined as coordinate values and a predetermined number N of second importance calculated by the second importance calculating means according to the representative datas.

5. An acceleration measuring device of claim 4, wherein the second importance calculating means calculates the second importance based on importance calculated from the additional information accumulated in the accumulating means according to the representative data and the first importance accumulated in the accumulating means according to the representative data.

6. An acceleration measuring device of claim 4, wherein the reference point estimating means defines a circle on the two dimensional orthogonal coordinate plane or a spherical surface on the three dimensional orthogonal coordinate space based on both a distribution of a group of a predetermined number N of representative datas accumulated by the accumulating means on the two dimensional orthogonal coordinate plane or the three dimensional orthogonal coordinate plane representative data and a group of a predetermined number N of second importance calculated by the second importance calculating means corresponding to the representative datas, estimates a coordinate of center point and a radius of the circle or the spherical surface, sets the estimated coordinate of center point as the reference point, and sets the radius of the respective axes as the scale reference, and
the offset correcting means corrects offsets of the respective two-axis or three-axis acceleration data based on the reference point estimated by the reference point estimating means.

7. An acceleration measuring device of claim 4, wherein the reference point estimating means defines an ellipse on the two dimensional orthogonal coordinate plane or an ellipsoidal surface on the three dimensional orthogonal coordinate space based on both a distribution of a group of a predetermined number N of representative datas accumulated by the accumulating means on the two dimensional orthogonal coordinate plane or the three dimensional orthogonal coordinate space representative data and a group of a predetermined number N of second importance calculated by the second importance calculating means corresponding to the representative datas, estimates a coordinate of center point and radiuses of respective principal axes of the ellipse or the ellipsoidal surface, sets the estimated coordinate of center point as the reference point, sets the radiuses of the respective principal axes as the scale reference, and
the offset correcting means corrects offsets and sensitivities of the respective two-axis or three-axis acceleration data based on the reference point and the scale reference of the respective axes estimated by the reference point estimating means.

8. An acceleration measuring device of any one of claims 4 to 7, wherein
the representative data calculating means calculates an average of the group of a predetermined number M of acceleration data as a representative data.

9. An acceleration measuring device of any one of claims 4 to 7, wherein
the first importance calculating means includes:
means for calculating fluctuation in the group of a predetermined number M of acceleration data; and
means for calculating importance A while the importance is higher as the fluctuation is smaller.

10. An acceleration measuring device of claim 9, wherein the fluctuation is a sum of variances on the respective axes of the group of a predetermined number M of acceleration data or a maximum value of the variances on the respective axes.

11. An acceleration measuring device of claim 9, wherein the fluctuation is a square sum of differences between maximum values and minimum values on the respective axes of the group of a predetermined number M of acceleration data or the square of a maximum value of the differences between the maximum values and the minimum values on the respective axes.

12. An acceleration measuring device of any one of claims 4 to 7, wherein
one of the additional information is temperature when the acceleration detecting means detects the group of acceleration data used in that the representative data calculating means calculates the representative data, and
the second importance calculating means includes means for calculating importance B, said importance B is lower in the case that a difference between temperature, one of the additional information, when the acceleration detecting means detects data and temperature when importance is calculated by the second importance calculating means is larger.

13. An acceleration measuring device of any one of claims 4 to 7, wherein
one of the additional information is time when the acceleration detecting means detects the group of data used in that the representative data calculating means calculates the representative data, and
the second importance calculating means includes means for calculating importance C, said importance C is lower in the case that a difference between time when the acceleration detecting means detects data and time when importance is calculated by the second importance calculating means is larger.

14. An acceleration measuring device of any one of claims 4 to 7,
further comprising selecting means for selecting in the case the representative data calculated by the representative data calculating means is appropriate, and wherein
the selecting means judges that the representative data calculated by the representative data calculating means is appropriate and then selects the representative data when the first importance calculated by the first importance calculating means is higher than a predetermined value.

15. An acceleration measuring device of any one of claims 4 to 7,
the accumulating means sets further linear axes that have linear relation with detection axes of the acceleration detecting means, compares values that obtained by subtracting the second importance corresponding to the representative datas from the representative datas when comparing maximum values, compares values that obtained by adding the representative datas to the second importance corresponding to the representative datas when comparing minimum values, and selectively accumulates a representative data such that a component of the detection axis or linear axis of the acceleration detecting means becomes a maximum or minimum value among a representative data newly selected by the selecting means and representative datas accumulated in the accumulating means.

16. An acceleration measuring device of claim 1, further comprising processed data storing means for storing the number of acceleration data weighted by the importance of the group of acceleration data obtained by the acceleration data obtaining means, a sum of respective axial components weighted by the importance of the group of acceleration data, a sum of values obtained by weighting squares of the respective axial components of the group of acceleration data with the importance, a group of coefficient of simultaneous equations for calculating the reference point and the scale reference of the respective axes, and the reference point and the scale reference, and wherein the reference point and the scale reference of the respective axes are estimated based on latest data obtained by the acceleration data obtaining means, importance calculated by the importance calculating means corresponding to the data, and the latest various processed data stored by the processed data storing means.

* * * * *

UNITED STATES PATENT AND TRADEMARK OFFICE
CERTIFICATE OF CORRECTION

PATENT NO. : 7,881,900 B2
APPLICATION NO. : 12/159976
DATED : February 1, 2011
INVENTOR(S) : Toru Kitamura et al.

It is certified that error appears in the above-identified patent and that said Letters Patent is hereby corrected as shown below:

Title page, item (73),
"Assignee:   Asahi Kasei Emd Corporation, Tokyo (JP)" should read
--Assignee:   Ashai Kasei EMD Corporation, Tokyo (JP)--.

Signed and Sealed this
Twenty-seventh Day of September, 2011

David J. Kappos
*Director of the United States Patent and Trademark Office*